(12) United States Patent
Sinha et al.

(10) Patent No.: US 10,635,945 B2
(45) Date of Patent: Apr. 28, 2020

(54) MACHINE LEARNING ANALYSIS OF PIPING AND INSTRUMENTATION DIAGRAMS

(71) Applicant: Schneider Electric Systems USA, Inc., Foxboro, MA (US)

(72) Inventors: Bhaskar Sinha, Hyderabad (IN); Ashish Patil, Pune (IN); Amitabha Bhattacharyya, Hyderabad (IN); Venkatesh Jagannath, Quincy, MA (US); Sameer Kondejkar, Pune (IN)

(73) Assignee: Schneider Electric Systems USA, Inc., Foxboro, MA (US)

(*) Notice: Subject to any disclaimer, the term of this patent is extended or adjusted under 35 U.S.C. 154(b) by 167 days.

(21) Appl. No.: 16/021,867

(22) Filed: Jun. 28, 2018

(65) Prior Publication Data

US 2020/0005094 A1 Jan. 2, 2020

(51) Int. Cl.
*G06K 9/46* (2006.01)
*G06K 9/62* (2006.01)
*G06K 9/00* (2006.01)
*G06N 20/00* (2019.01)

(52) U.S. Cl.
CPC ....... *G06K 9/6267* (2013.01); *G06K 9/00442* (2013.01); *G06K 9/6256* (2013.01); *G06K 9/6262* (2013.01); *G06N 20/00* (2019.01); *G06K 2209/01* (2013.01)

(58) Field of Classification Search
CPC ........ G06N 20/00; G06N 3/08; G06N 3/0454; G06N 3/02; G06N 3/0472; G06N 7/005; G06N 3/088; G06N 3/006; G06N 5/02; G06N 3/126; G06N 20/20; G06T 2207/20081; G06T 2207/20084; G06T 7/0002; G06T 7/0014; G06T 7/20; G06T 2207/30168; G06T 2207/20076; G06T 15/205; G06T 2207/10012; G06K 9/4628; G06K 2209/05; G06K 9/00369; G06K 9/46; G06K 9/6262; G06K 9/00147; G06K 9/00302; G06K 9/0063; G06K 9/325; G16H 30/40; G06F 16/55
See application file for complete search history.

(56) References Cited

U.S. PATENT DOCUMENTS

| | | | |
|---|---|---|---|
| 2003/0158795 A1 | 8/2003 | Markham et al. | |
| 2007/0005266 A1 | 1/2007 | Blevins et al. | |
| 2009/0292514 A1 | 11/2009 | McKim et al. | |
| 2014/0363052 A1* | 12/2014 | Kozitsky | G06K 9/00624 382/105 |

(Continued)

OTHER PUBLICATIONS

International Search Report and Written Opinion dated Oct. 4, 2019 relating to PCT Application No. PCT/US2019/036651, 10 pages.

*Primary Examiner* — Quan M Hua
(74) *Attorney, Agent, or Firm* — Stinson LLP

(57) ABSTRACT

Automated evaluation and extraction of information from piping and instrumentation diagrams (P&IDs). Aspects of the systems and methods utilize machine learning and image processing techniques to extract relevant information, such as tag names, tag numbers, and symbols, and their positions, from P&IDs. Further aspects feed errors back to a machine learning system to update its learning and improve operation of the systems and methods.

14 Claims, 22 Drawing Sheets

(56) References Cited

U.S. PATENT DOCUMENTS

| | | | |
|---|---|---|---|
| 2015/0213310 A1* | 7/2015 | Wolk | G06K 9/00456 |
| | | | 382/225 |
| 2015/0338836 A1 | 11/2015 | Law et al. | |
| 2016/0161930 A1 | 6/2016 | Jirkovsky et al. | |
| 2016/0210532 A1* | 7/2016 | Soldevila | G06K 9/6215 |
| 2017/0147807 A1 | 5/2017 | Rooyakkers | |
| 2017/0228589 A1 | 8/2017 | Parapurath et al. | |

* cited by examiner

MACHINE LEARNING ANALYSIS OF PIPING AND INSTRUMENTATION DIAGRAMS

TECHNICAL FIELD

Aspects of the present disclosure generally relate to industrial process automation and control systems. More particularly, aspects of the present disclosure relate to systems and methods of automatically evaluating and extracting information from piping and instrumentation diagrams (P&IDs).

BACKGROUND

Project engineers are typically provided with P&IDs in the form of hard copy printouts or portable document file (PDF) format. These diagrams must be manually analyzed to extract information related to tags, loops, and associated metadata. This manual analysis is time-consuming and error-prone. For example, it may take several minutes (e.g., 30 to 90) to analyze each drawing, which adds up to many hours for each project. Moreover, any errors in the manual work require reworking, which is wasteful and expensive (e.g., lost time, delay penalties, etc.). Additionally, delays in completion of this engineering work can cause delays in commissioning of the industrial process because the project engineering activities are on the critical chain path. At most, conventional techniques utilize systems and methods to digitize P&IDs, such as via optical character recognition (OCR) for example. However, these conventional techniques are static, require an exact match to recognize characters and geometrical shapes, and must be re-coded to accept new symbols or characters.

SUMMARY

Aspects of the invention analyze P&IDs utilizing machine learning and image processing techniques to extract relevant information, such as tag names, tag numbers, symbols, and their relative positions from the diagrams. Aspects of the invention additionally feed errors back to the machine learning system to update its learning and improve operation of the system. The error feedback enables the techniques described herein to learn new objects and texts with minimal or no coding.

A computer-implemented method embodying aspects of the disclosure includes a machine learning system executing on a computing device that accesses an image of a P&ID. A symbol classification engine executing on the computing device determines whether the accessed image includes a symbol indicative of a process control element. The symbol classification system is trained, using supervised learning, to classify images into a plurality of classes based on whether the accessed image includes the symbol indicative of the process control element. Upon determining the accessed image includes the symbol, a symbol output is stored in a computer-readable memory storage device. A tag classification engine executing on the computing device determines whether the accessed image includes a tag corresponding to the symbol. The tag classification engine is trained, using supervised learning, to classify images into a plurality of classes based on whether the accessed image includes the tag. Upon determining the accessed image includes the tag, a tag output is stored in the computer-readable memory storage device.

A system embodying aspects of the disclosure includes a P&ID analysis processor and a computer-readable storage device. The storage device stores processor-executable instructions that, when executed by the processor, comprise an image converter, one or more filtering algorithms, a symbol extractor, one or more tag pre-processing algorithms, a tag extractor, and an intelligent system. The image converter is configured to receive a P&ID in an electronic format and convert it into a compute image in an image format. The filtering algorithms are configured to process the compute image to obtain an approximate size of a symbol in the image. The symbol extractor is configured to extract the symbol from the compute image and store the extracted symbol on the computer-readable storage device. The tag pre-processing algorithms are configured to remove symbol lines from the symbol in the compute image. The tag extractor is configured to extract a tag component of the symbol in the compute image and store the extracted tag on the computer-readable storage device. And the intelligent system is configured to receive symbol feedback from the filtering algorithms, receive tag feedback from the tag post-processing algorithms, retrain the symbol extractor based on the received symbol feedback, and retrain the tag extractor based on the received tag feedback.

Another computer-implemented method embodying aspects of the disclosure includes receiving a digitized P&ID and using a symbol engine to analyze the digitized P&ID to identify and extract a symbol from it. In one form, the analyzing results in at least one symbol error. A tag engine is used to analyze the digitized P&ID to identify and extract a tag from it. In one form, the analyzing results in at least one tag error. The extracted symbol and tag are stored on a computer-readable storage medium. The symbol engine is retrained based on the at least one symbol error and the tag engine is retrained based on the at least one tag error.

Other objects and features will be in part apparent and in part pointed out hereinafter.

BRIEF DESCRIPTION OF THE DRAWINGS

Corresponding reference characters indicate corresponding parts throughout the drawings.

DETAILED DESCRIPTION

Figure 1:
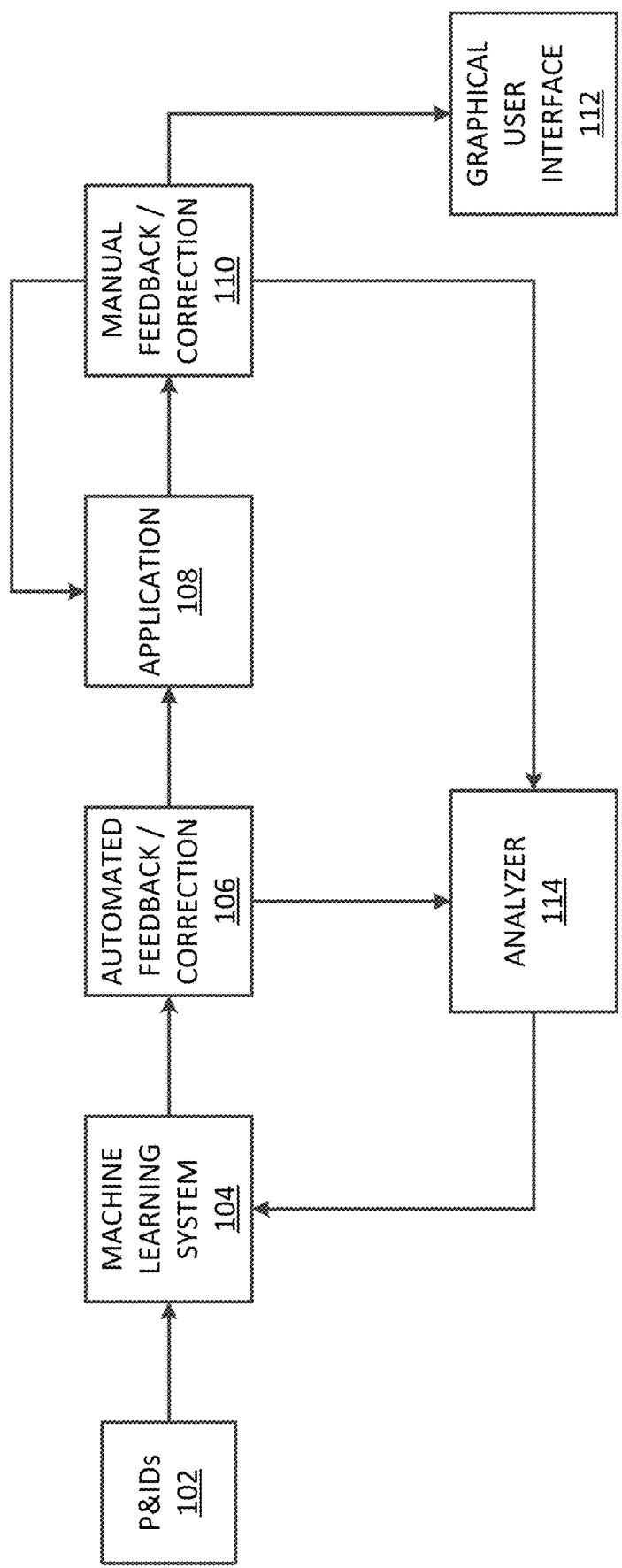
FIG. 1 illustrates an evolving piping and instrumentation diagram (P&ID) analysis system and method according to an embodiment.

Referring to FIG. 1, an evolving piping and instrumentation diagram (P&ID) analysis system and method, generally indicated at 100, extracts relevant information from the diagrams and feeds errors back to a machine learning system to update its learning and improve operation of the system and method. In this manner, aspects of system and method 100 are configured to learn new objects and texts in the diagrams without requiring extensive new coding and update and train the models for all projects across the globe (e.g., global learning) or across a given project (e.g., local learning). As shown in FIG. 1, the system 100 includes P&IDs 102, a machine learning system 104, an automated feedback/correction component 106, an application 108, a manual feedback/correction component 110, a graphical user interface (GUI) 112, and an analyzer 114.

The P&IDs 102 are fed into the machine learning system 104 and the machine learning system 104 utilizes machine learning and image processing techniques to extract relevant information, such as tag names, tag numbers, and symbols, from the P&IDs 102. In one form, the P&IDs 102 include information, such as tag names, tag numbers, and symbols that represent aspects of industrial process systems adapted for changing or refining raw materials to create end products. Exemplary processes include, but are not limited to, those in the chemical, oil and gas, food and beverage, pharmaceutical, water treatment, and power industries. For example, processes may include pumps, valves, sensors, conveyers, power distribution systems, and/or processes or operations that cannot be interrupted.

In an embodiment, the P&IDs 102 are received via one or more communication networks capable of facilitating the exchange of data. For example, the communication networks may include a wide area network (WAN) and/or a local area network (LAN) that is connectable to other telecommunications networks, including other WANs, LANs, and/or portions of the Internet or an intranet. The communication networks may be any telecommunications network that facilitates the exchange of data, such as those that operate according to the IEEE 802.3 (e.g., Ethernet) and/or the IEEE 802.11 (e.g., Wi-Fi) protocols, for example. In another embodiment, the communication networks are any media that allow data to be physically transferred through serial or parallel communication channels (e.g., copper wire, optical fiber, computer bus, wireless communication channel, etc.). In an embodiment, the communication networks comprise at least in part a process control network. In another embodiment, the communication networks comprise at least in part a supervisory control and data acquisition (SCADA) system. In yet another embodiment, the communication networks comprise at least in part an enterprise manufacturing intelligence (EMI)/operational intelligence (OI) system.

The machine learning system 104 implements image processing and/or geometrical algorithms to reduce noise and enhance its accuracy. The automated feedback/correction component 106 includes rules and algorithms configured to detect errors in the output received from machine learning system 104. These errors are used to auto-correct the output and are fed back into the machine learning system 104 via the analyzer 114 to update the learning of machine learning system 104 and improve system 100. The processed output from automated feedback/correction component 106 is then displayed to a user via the application 108 for validation. The corrections made by the user are captured by the manual feedback/correction component 110 and saved in application 108 and fed back into the machine learning system 104 via the analyzer 114 to update the learning of machine learning system 104 and improve system 100. In this manner, system and method 100 continuously evolve to automatically evaluate P&IDs 102 and extract relevant information, such as tag names, tag numbers, symbols and their categories (e.g., sensors, displays, motors, pumps, valves, etc.), their locations in the P&ID, unit, plant, area, and revision number using machine learning and image processing algorithms.

Figure 2:
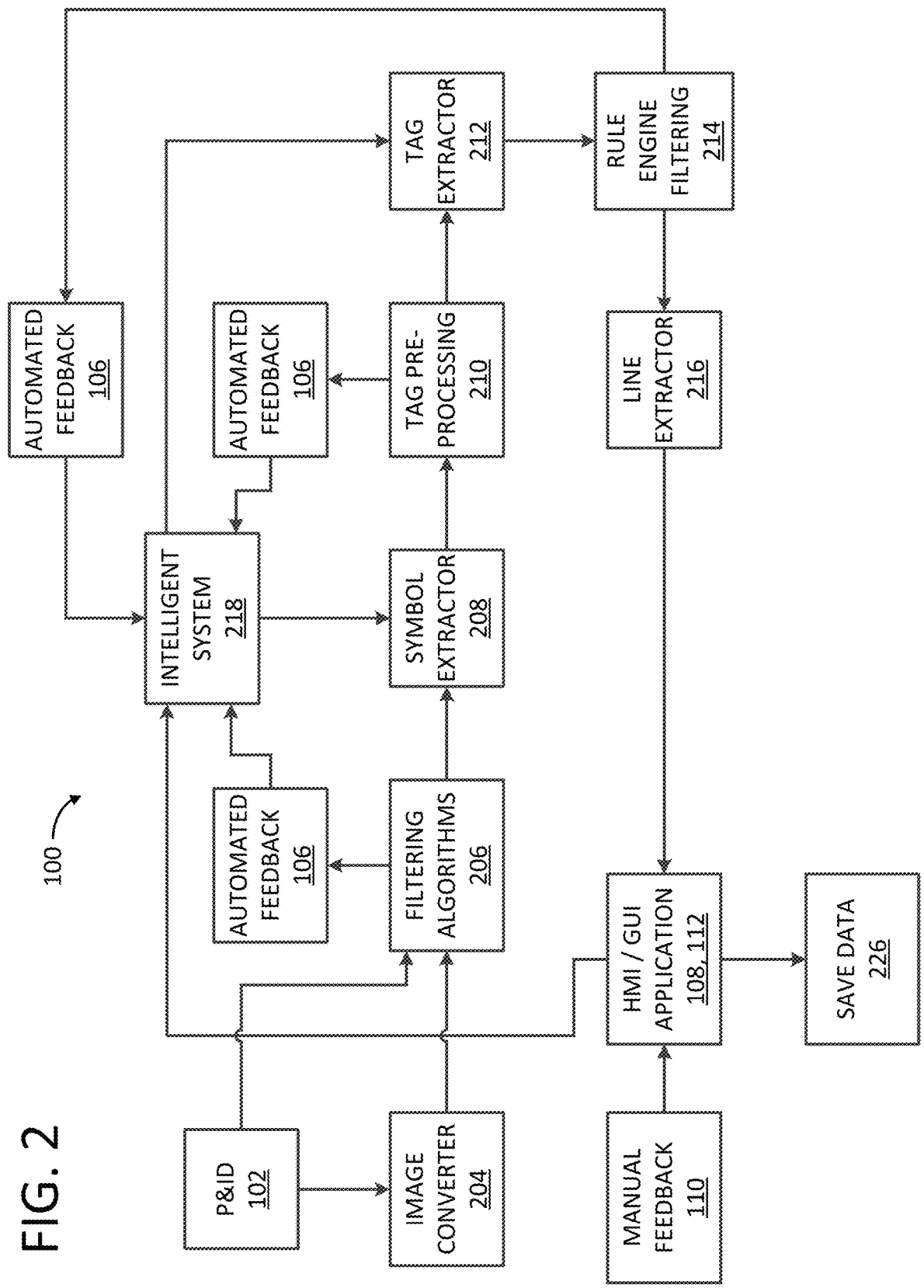
FIG. 2 illustrates another embodiment of the evolving P&ID analysis system and method of FIG. 1.

FIG. 2 illustrates another embodiment of system and method 100. In this embodiment, system and method 100 include P&IDs 102, an image converter 204, filtering algorithms 206, symbol extraction 208, tag pre-processing 210, tag extraction 212, a rules engine 214, line extraction 216, an intelligent system 218, automated feedback/correction component 106, application 108, manual feedback/correction component 110, and GUI 112. In an embodiment, image converter 204, filtering algorithms 206, symbol extraction 208, tag pre-processing 210, tag extraction 212, rules engine 214, line extraction, and intelligent system 218 comprise, at least in part, machine learning system 104 and/or analyzer 114.

Figure 3:
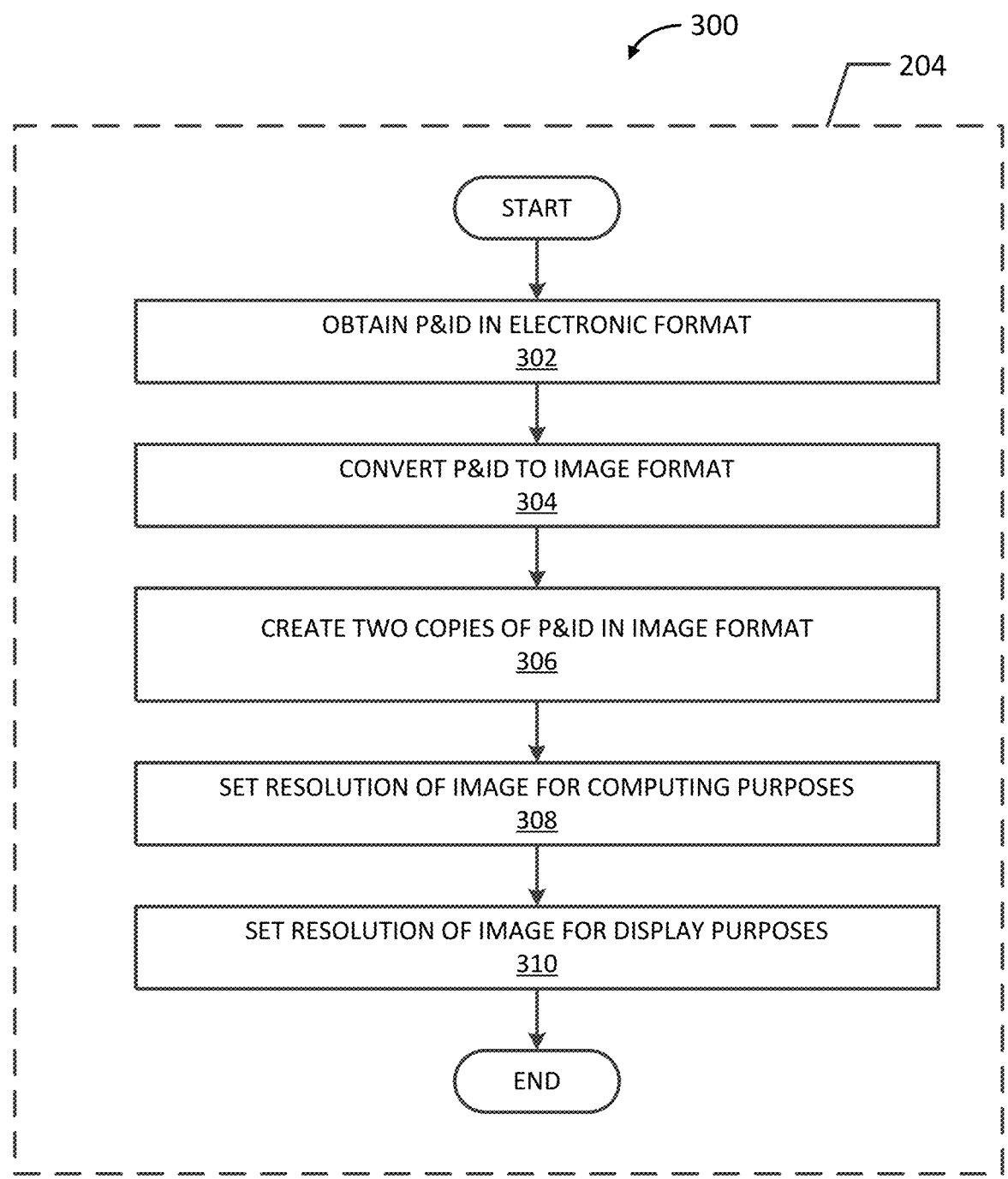
FIG. 3 illustrates an exemplary process of converting P&IDs into an image format according to an embodiment.

The image converter 204 is configured to convert P&IDs 102 to an image format. FIG. 3 illustrates an exemplary method, generally indicated at 300, of image converter 204 converting P&IDs 102 into an image format. In an embodiment, image converter 204 obtains P&IDs 102 at 302 in a portable document file (PDF) or other electronic data format. At 304, image converter 204 converts them to any image format. Exemplary image formats include, but are not limited to, Portable Network Graphics (PNG) format, Joint Photographic Experts Group (JPEG) format, Graphics Interchange Format (GIF), and the like. In an embodiment, image converter 204 creates two image files at 306, one of which is for display (e.g., via application 108 and/or GUI 112) and one of which is for computation (e.g., analysis by filtering algorithms 206, symbol extraction 208, tag pre-processing 210, tag extraction 212, rules engine 214, line extraction 216, and intelligent system 218). The P&IDs 102 may be received by image converter 204 in various dimensions (e.g., 16.54×11.69 in., 34.00×22.00 in., etc.). The image converter 204 sets the resolution of the image created for computing purposes (i.e., "compute image") at 308 and sets the resolution of the image created for display purposes (i.e. "display image") at 310. The maximum dots per inch (dpi) of the images created by image converter 204 is calculated as 300,000/(length×width in inches). In an embodiment, the compute image has a maximum capping of 800 dpi and the display image has a resolution of about 200 dpi.

In an embodiment, image converter 204 comprises processor-executable instructions embodied on a storage memory device to provide image converter 204 via a software environment. For example, image converter 204 may be provided as processor-executable instructions that comprise a procedure, a function, a routine, a method, and/or a subprogram utilized independently or in conjunction with additional aspects of system 100 by a computing device, as further described herein, according to an exemplary embodiment of the disclosure.

Referring again to FIG. 2, in some embodiments, P&IDs 102 include geometrical and text information that can be extracted using off-the-shelf libraries. In these embodiments, P&IDs 102 are fed directly into machine learning system 104 (e.g., filtering algorithms 206) to recognize their types and extracted texts without first feeding them into image converter 204.

The filtering algorithms 206 are configured to process the compute image to obtain an approximate size of symbols therein. Exemplary symbols include, but are not limited to, those that conform to the International Society of Automation (ISA) standards for instruments, control/display elements, programmable logic controllers (PLCs), valves, pumps, and the like. In an embodiment, the symbols include identification letters (e.g., FIC) and a tag number (e.g., 123). Obtaining the approximate size of the symbols helps to normalize the input to the machine learning aspects of system and method 100 for P&ID symbol detection, which helps avoid creating training data for different sizes of symbols.

Figure 4A:
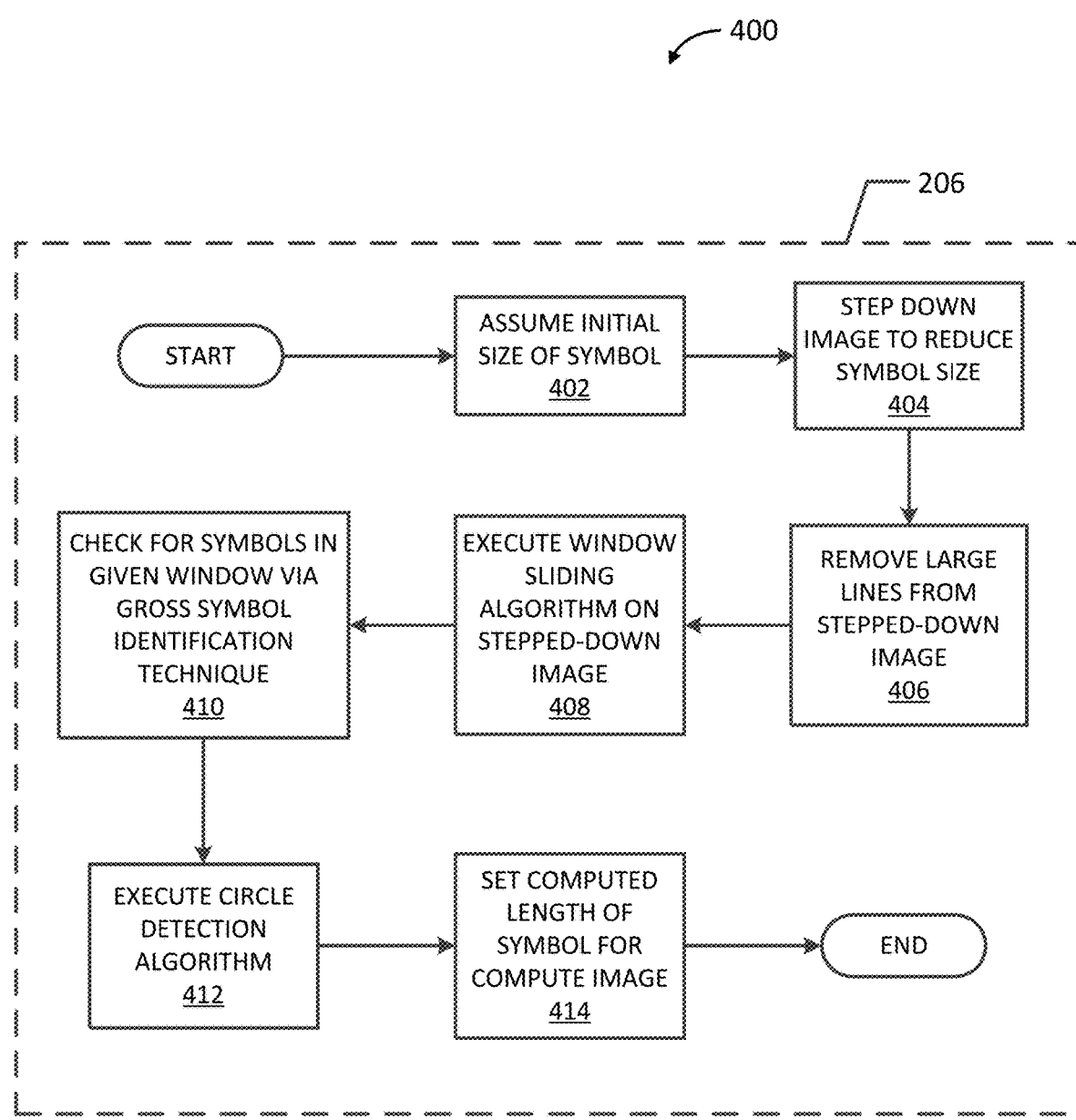
FIG. 4A illustrates an exemplary process of computing approximate sizes of symbols in P&IDs according to an embodiment.

FIG. 4A illustrates an exemplary method, generally indicated at 400, for computing approximate symbol sizes. The filtering algorithms 206 assume, at 402, an initial size of a symbol. In an embodiment, the initial size is 200×200 pixels. At 404, the filtering algorithms 206 step down the compute image to reduce the symbol size. In an embodiment, the compute image is stepped down such that the assumed symbol size is 52×52 pixels. The filtering algorithms 206 remove large (e.g., greater than 75% of the height of the P&ID, etc.) lines (horizontal and vertical) from the stepped-down image at 406. At 408, the filtering algorithms 206 execute a window sliding algorithm on the stepped-down image and check, at 410, for symbols in a given window via a gross symbol identification technique, as further described herein. In an embodiment, the window sliding algorithm detects areas in the stepped-down image that have black pixels distributed across a window of size 52×52 pixels. The filtering algorithms 206 record the location of an identified symbol in the stepped-down image and use that location to compute the location of the identified symbol in the compute image. The filtering algorithms 206 then execute, at 412, a circle detection algorithm (e.g., an adaptation of a "you only look once" (YOLO) algorithm) on the extracted symbol and set, to predict the scale of the input P&ID image at 414, a computed length of the symbol for the compute image. In an embodiment, the circle detection algorithm is executed across all detected images to obtain the most frequently occurring diameter of the circle and the most frequent diameter is set as the computed length of the symbol for the compute image. One of ordinary skill in the art will understand that the pixel sizes described herein are exemplary and that any other sizes may be used to achieve similar results within one or more aspects of the disclosure.

In an embodiment, filtering algorithms 206 comprise processor-executable instructions embodied on a storage memory device to provide filtering algorithms 206 via a software environment. For example, filtering algorithms 206 may be provided as processor-executable instructions that comprise a procedure, a function, a routine, a method, and/or a subprogram utilized independently or in conjunction with additional aspects of system 100 by a computing device, as further described herein, according to an exemplary embodiment of the disclosure.

Figure 4B:
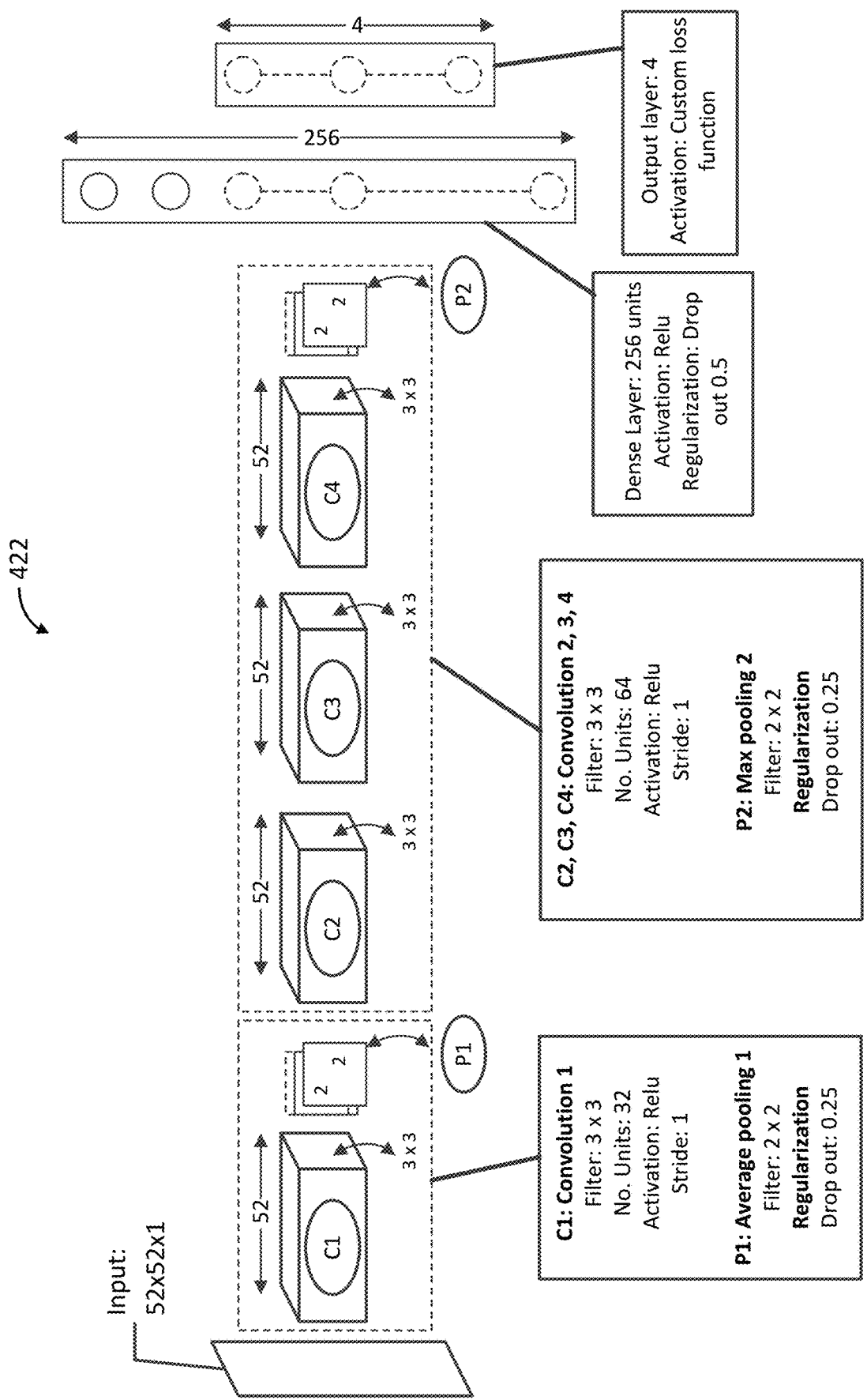
FIG. 4B illustrates an exemplary convolution network for computing the scale of the input P&ID image by predicting the radius of circles in symbols according to an embodiment.

FIG. 4B illustrates an exemplary convolution network, generally indicated at 422, configured to predict the circle radius. In an embodiment, the convolution network 422 inputs one channel of binary images each having a size of 52×52 pixels and outputs an array indicating whether the symbol is a circle, the center coordinates, and the radius (e.g., [is-Circle?, center_x, center_y, radius]). Beneficially, this helps identify the scale of the input image. In one form, the convolution network 422 includes a training accuracy of 92% on 3200 original training data units and does not utilize augmented training data.

Figure 5A:
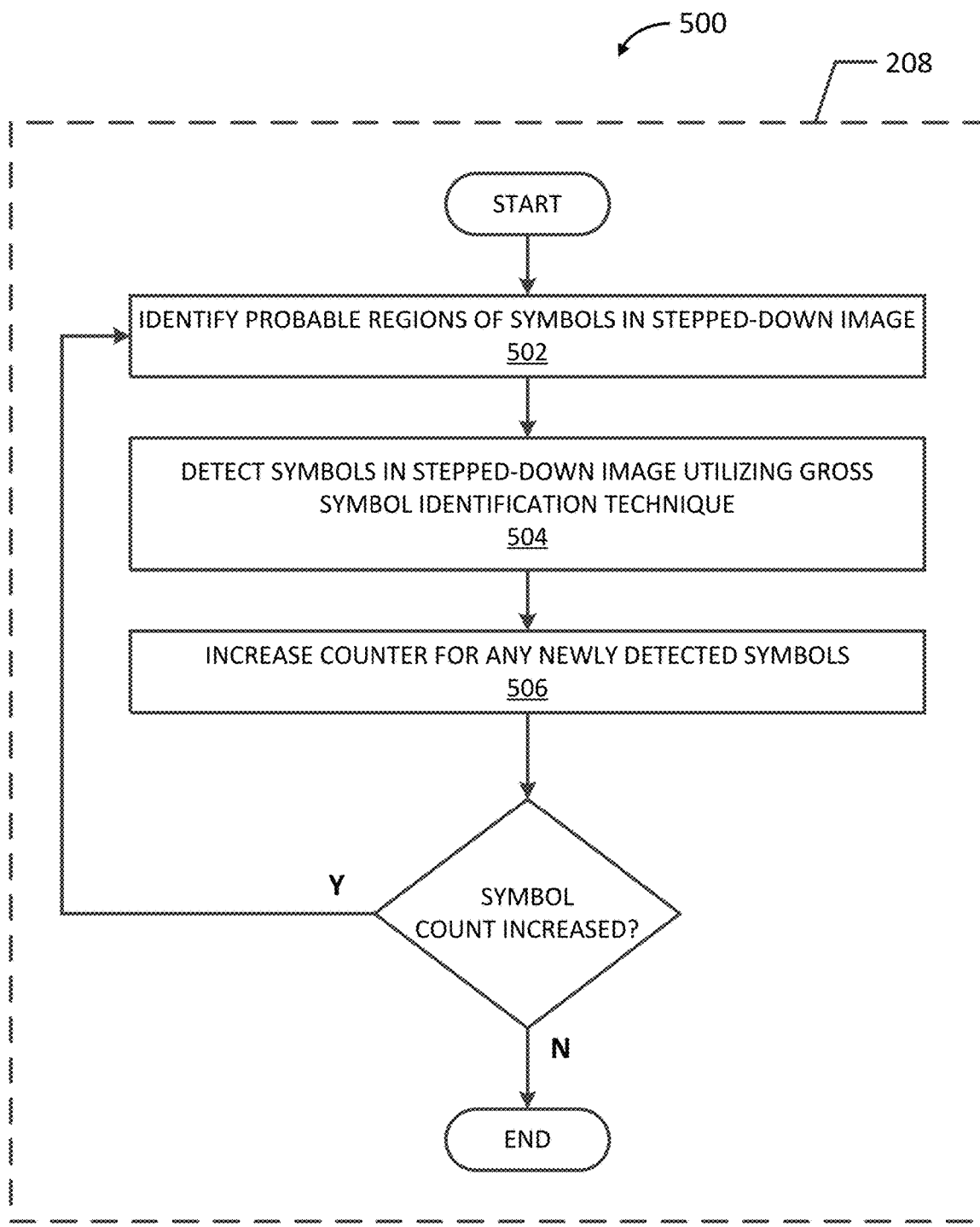
FIG. 5A illustrates an exemplary process of detecting symbols in a stepped down image according to an embodiment.

Referring again to FIG. 2, symbol extractor 208 is configured to detect symbols in the stepped down image. FIG. 5A illustrates an exemplary method, generally indicated at 500, for detecting symbols in the stepped down image. At 502, symbol extractor 208 applies image processing algorithms to identify the probable regions of symbols in the stepped down image having a symbol size of 52×52 pixels. At 504, symbol extractor 208 detects the symbols, their exact types, and their locations in the stepped down image (52×52 pixels) via a gross symbol identification technique. The symbol extractor 208 increases, at 506, a counter for any newly detected symbols. In this manner, symbol extractor 208 keeps track of the number of detected symbols and can determine whether any new symbols were detected during a current execution cycle. When the symbol count increased during the current cycle, the method returns to step 502 and repeats. When the symbol count did not increase during the current cycle, the method ends.

In an embodiment, symbol extractor 208 comprises processor-executable instructions embodied on a storage memory device to provide symbol extractor 208 via a software environment. For example, symbol extractor 208 may be provided as processor-executable instructions that comprise a procedure, a function, a routine, a method, and/or a subprogram utilized independently or in conjunction with additional aspects of system 100 by a computing device, as further described herein, according to an exemplary embodiment of the disclosure. In an embodiment, filtering algorithms 206 and symbol extractor 208 comprise, at least in part, a symbol classification engine.

Figure 5B:
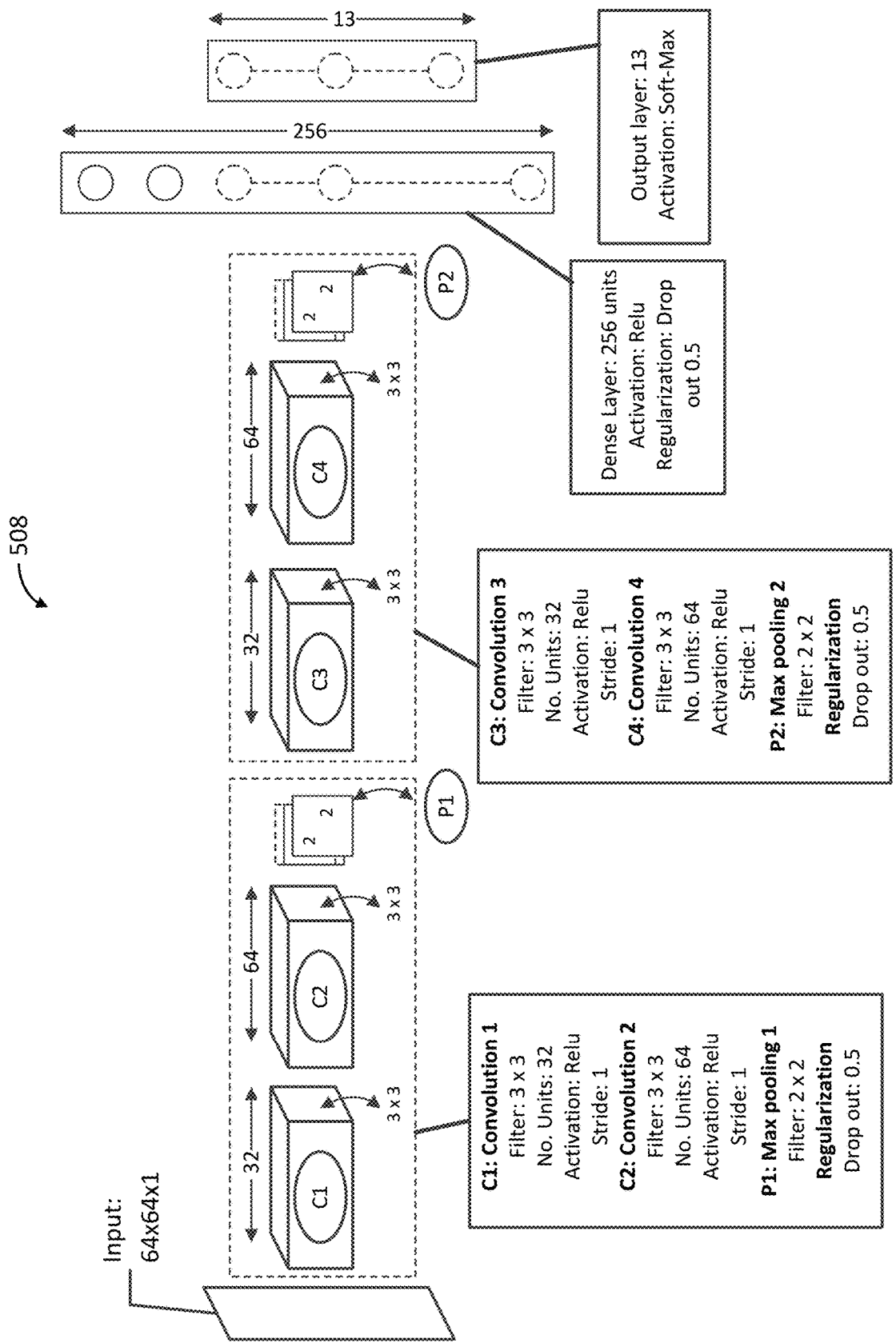
FIG. 5B illustrates an exemplary convolution network for recognizing symbols in the stepped down image according to an embodiment.

FIG. 5B illustrates an exemplary convolution network, generally indicated at 508, configured to recognize symbols in the stepped down image. In an embodiment, the convolution network 508 inputs one channel of binary images each having a size of 64×64 pixels and outputs the name of detected symbols. In one form, the convolution network 508 includes 6,073 original training data units and utilizes 151,790 augmented training data units (e.g., 144,156 for training and 7,581 for validation). The table below describes exemplary augmentation techniques utilized for convolution network 508 in accordance with an aspect of the disclosure.

| Augmentation Methods | Description | Offset-Value |
|---|---|---|
| Zero-offset | Project input original image to 64 × 64 size image | 0 |
| Horizontal and vertical offsets | Offset horizontal and vertically zero-offset image with specified values | Horizontal: 2, 4, 6, −2, −4, −6 Vertical: 2, 4, 6, −2, −4, −6 |
| Diagonal offset | Move zero offset diagonally | Diagonal values: (−2, −2), (−2, 2), (2, −2), (2, 2), (4, 4), (−4, −4), (−4, 4), (4, −4), (6, 6), (−6, −6), (−6, 6), (6, −6) |

Figure 6A:
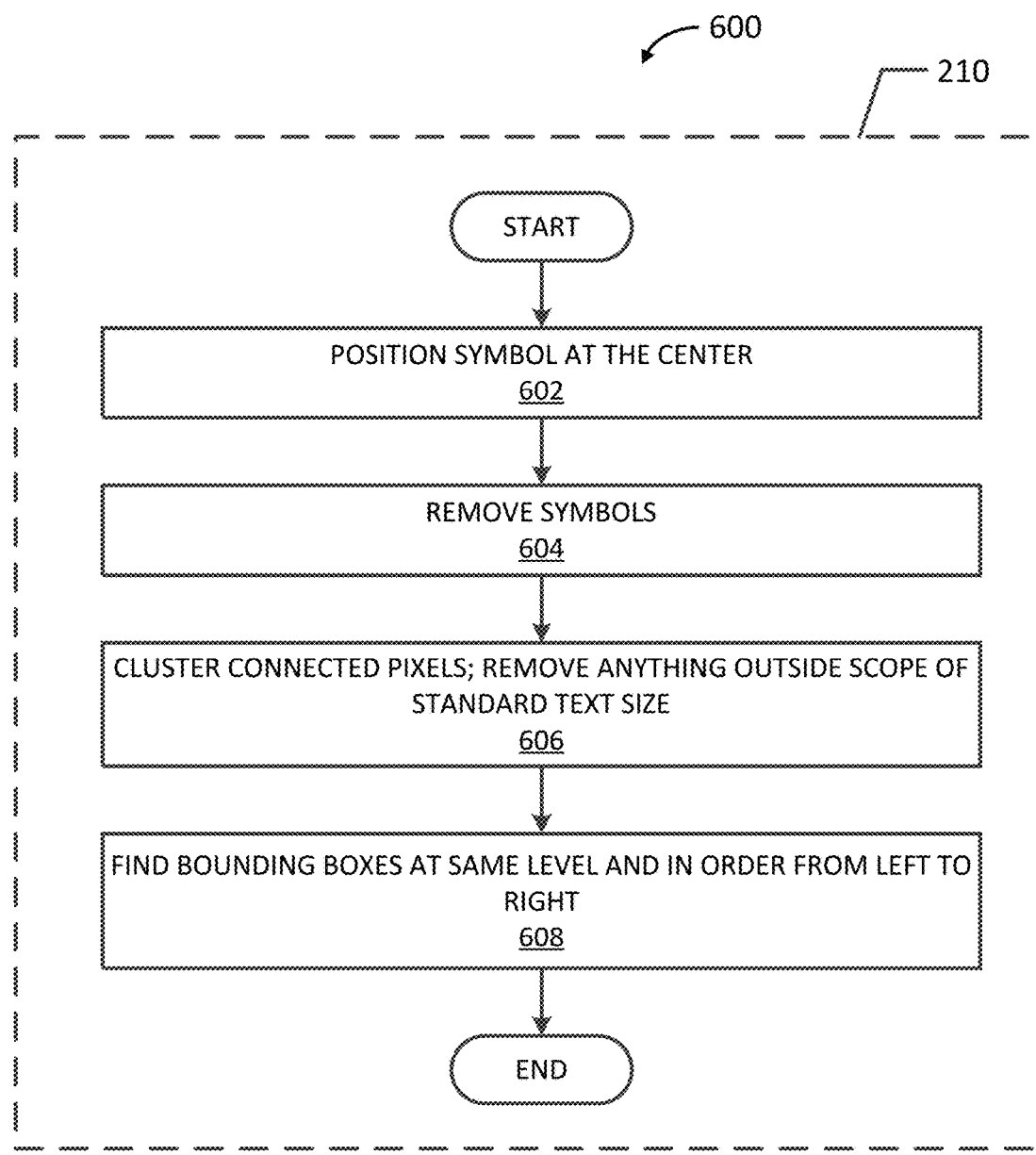
FIG. 6A illustrates an exemplary process of removing symbol lines from detected symbols according to an embodiment.
Figure 6B:
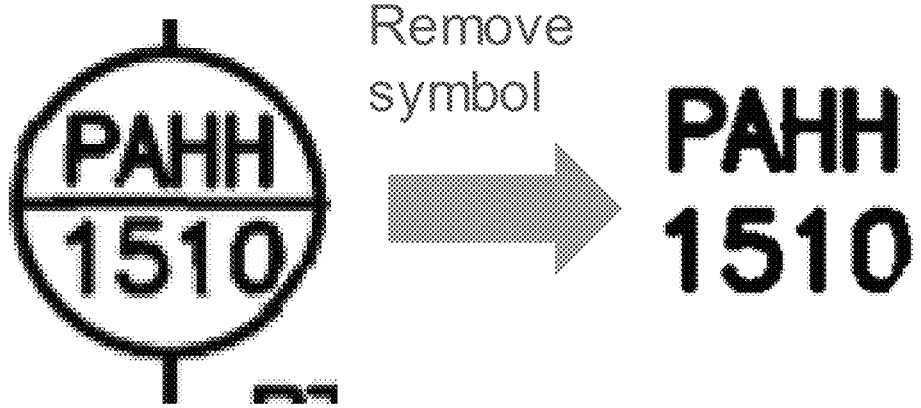
FIG. 6B illustrates an exemplary output of a tag component of a symbol after the symbol lines have been removed according to an embodiment.
Figure 6C:
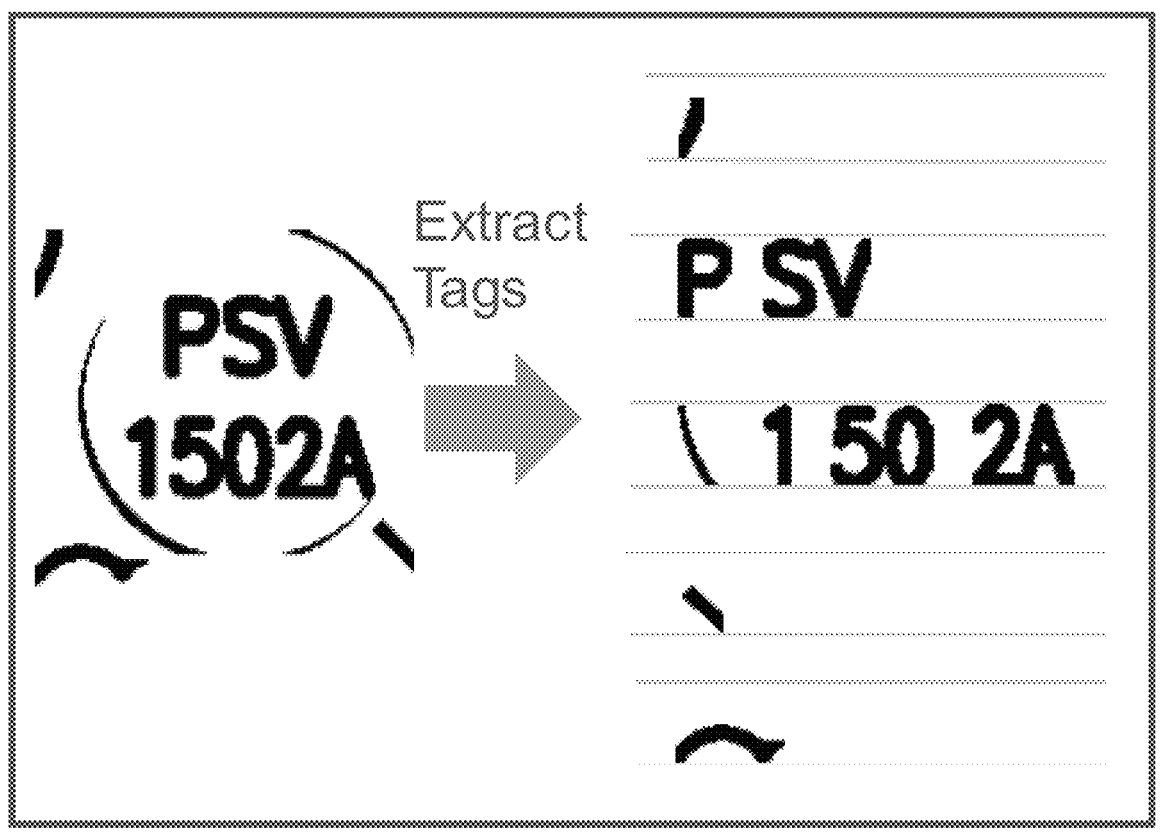
FIG. 6C illustrates an exemplary output of an extracted tag according to an embodiment.

Referring again to FIG. 2, tag pre-processing 210 is configured to remove symbol lines from detected symbols in the compute image, leaving only the tag components (e.g., identification letters and tag number) in the compute image. FIG. 6A illustrates an exemplary method, generally indicated at 600, for removing symbol lines from detected symbols. At 602, tag pre-processing algorithms 210 center the symbol. Then the tag pre-processing algorithms 210 remove the symbol lines from the symbols at 604, leaving only the tag components. At 606, the tag pre-processing algorithms 210 cluster connected pixels and remove anything less than a standard text size and greater than a standard text size. Each cluster has bounding boxes. The tag pre-processing algorithms 210, at 608, find bounding boxes at the same level and in order from left to right. In this manner, tag pre-processing algorithms 210 are configured to remove non-tag pixels and noise. FIG. 6B illustrates an exemplary output of the tag component of a symbol after the symbol lines have been removed (e.g., after step 604) and FIG. 6C illustrates an exemplary output of the extracted tag (e.g., after steps 606 and 608).

In an embodiment, tag pre-processing algorithms 210 comprise processor-executable instructions embodied on a storage memory device to provide tag pre-processing algorithms 210 via a software environment. For example, tag pre-processing algorithms 210 may be provided as processor-executable instructions that comprise a procedure, a function, a routine, a method, and/or a subprogram utilized independently or in conjunction with additional aspects of system 100 by a computing device, as further described herein, according to an exemplary embodiment of the disclosure.

Figure 7A:
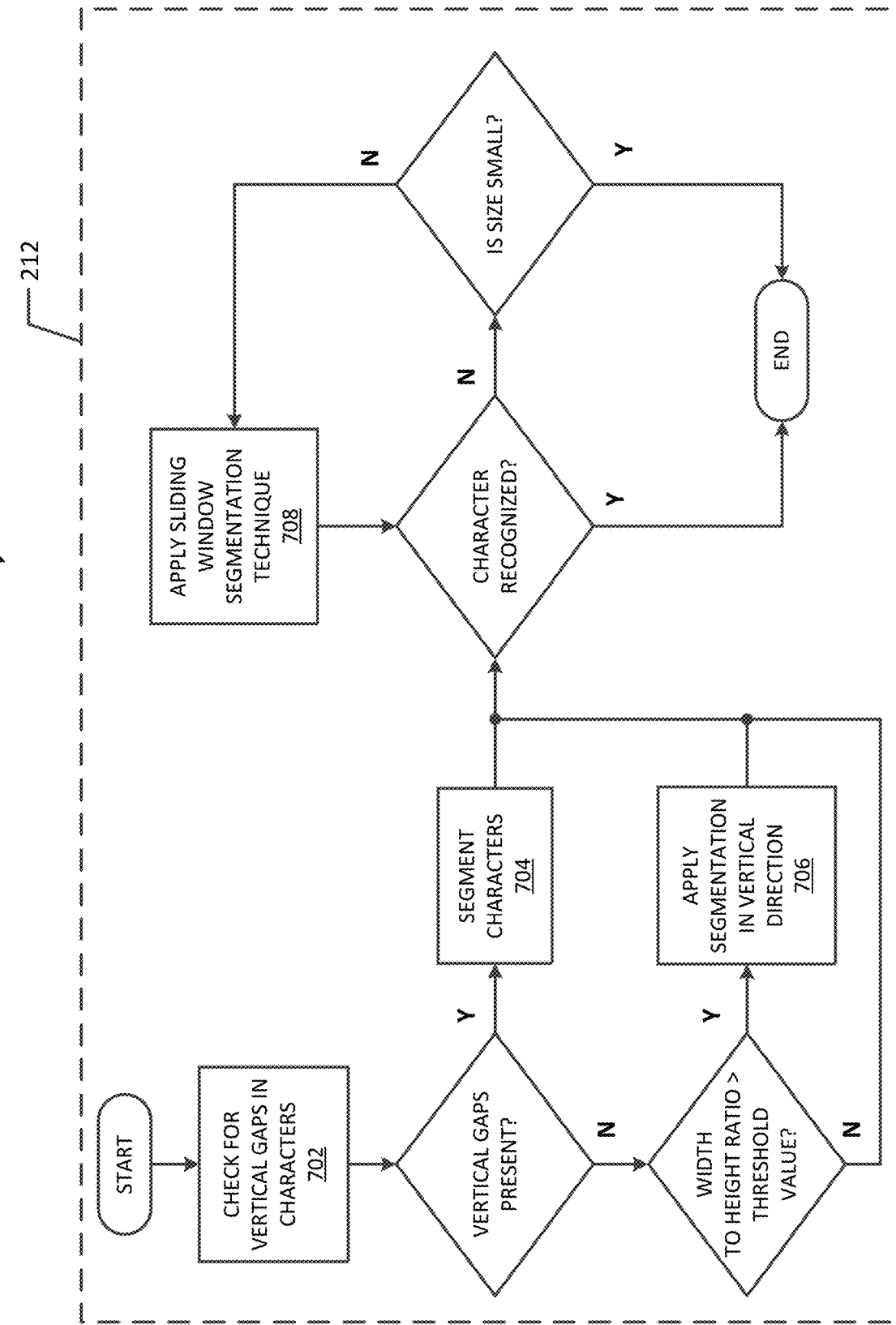
FIG. 7A illustrates an exemplary process of extracting the tag component of a symbol according to an embodiment.

Referring again to FIG. 2, tag extractor 212 is configured to extract the tag component of a symbol in the compute image. FIG. 7A illustrates an exemplary method, generally indicated at 700, for extracting the tag component of a symbol. In an embodiment, the tag includes a tag name and tag number and is recognized via machine learning. In some embodiments, neighboring characters in the tag name and/or tag number are joined with each other and must be separated via one or more segmentation techniques. At 702, tag extractor 212 checks for vertical gaps in the characters of the tag. When vertical gaps are present, tag extractor 212 segments the characters at 704 and thereafter performs character recognition using machine learning techniques. When no vertical gaps are present, tag extractor 212 determines whether a width to height ratio of the given character set is greater than a predetermined threshold value (e.g., 0.6, etc.). When the width to height ratio is greater than the predetermined threshold value, tag extractor 212 applies segmentation using pixel density in the vertical direction. Areas showing peaks of white pixels are potential areas of split in the joined characters. Thereafter, tag extractor 212 performs character recognition using machine learning techniques. When the width to height ratio is less than or equal to the threshold value, tag extractor 212 performs character recognition using machine learning techniques. When character recognition fails, tag extractor 212 determines whether the size of the characters is small (e.g., a check is applied to take care of characters not split by previous techniques). Furthermore, tag extractor 212 applies, at 708, a sliding window segmentation technique. When the sliding window segmentation technique does not recognize a character the process repeats but any character recognition results, or method having output of small size helps, in stopping the sliding window.

In an embodiment, tag extractor 212 comprises processor-executable instructions embodied on a storage memory device to provide tag extractor 212 via a software environment. For example, tag extractor 212 may be provided as processor-executable instructions that comprise a procedure, a function, a routine, a method, and/or a subprogram utilized independently or in conjunction with additional aspects of system 100 by a computing device, as further described herein, according to an exemplary embodiment of the disclosure. In an embodiment, tag pre-processing algorithms 210 and tag extractor 212 comprise, at least in part, a tag classification engine.

Figure 7B:
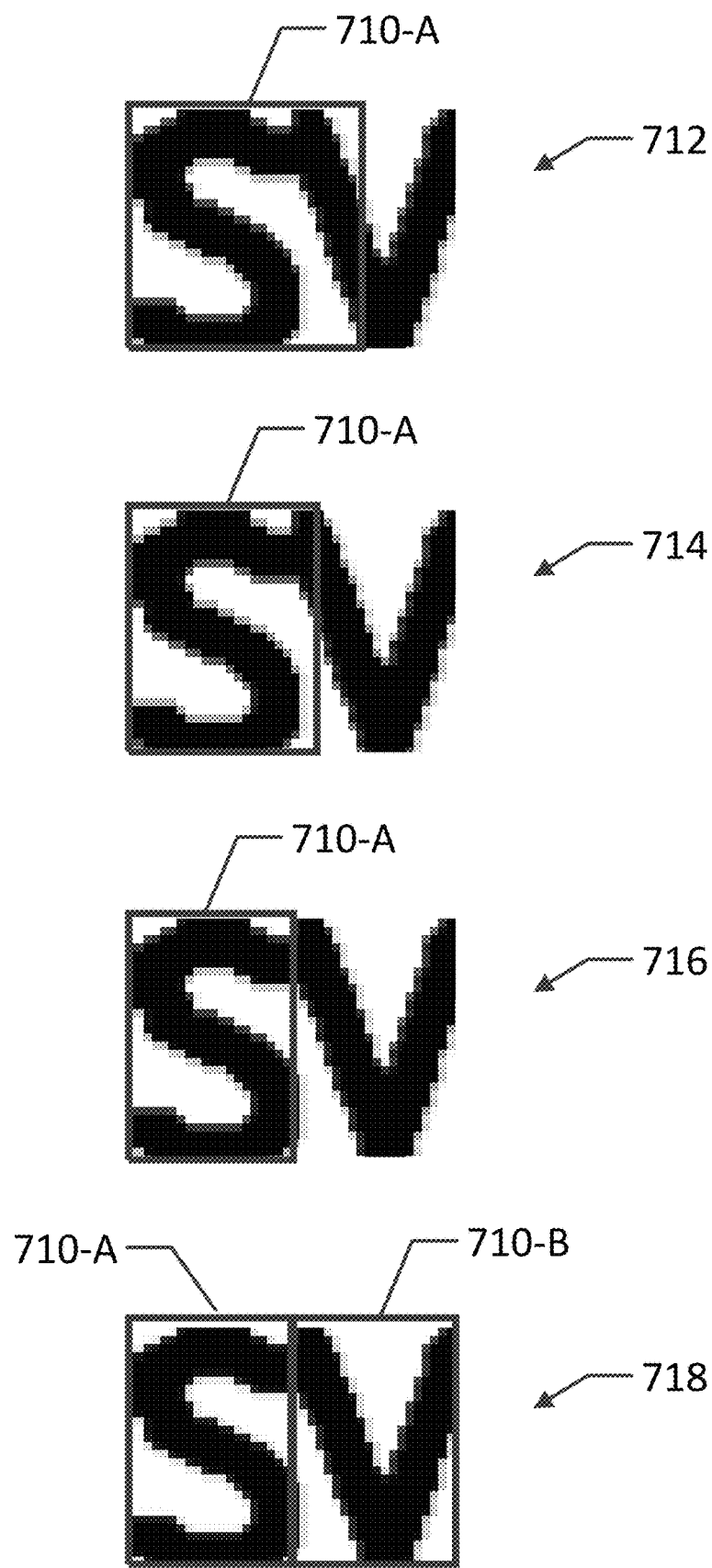
FIG. 7B illustrates an exemplary sliding window segmentation technique according to an embodiment.

FIG. 7B illustrates aspects of the sliding window segmentation technique. At 712, the characters "S" and "V" are joined together and tag extractor 212 utilizes a sliding window 710-A to segment them. The tag extractor 212 tests if the given slide produces any character recognized by machine learning (e.g., machine learning system 104). If not, tag extractor 212 reduces the size of the sliding window 710-A, shown at 714, and repeats the process. When the machine learning component recognizes a character, shown at 716, tag extractor 212 stores the character and advances the window to the next position. As shown at 718, the steps are repeated for the next character with another sliding window 710-B.

Figure 7C:
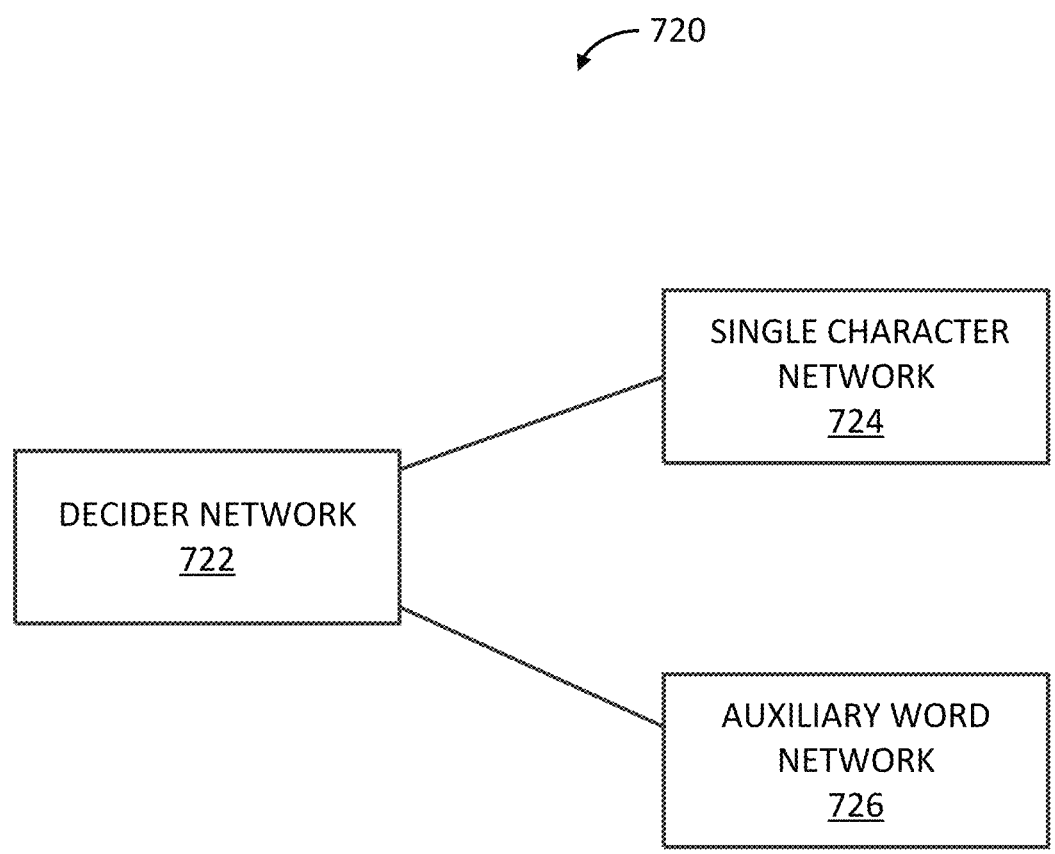
FIG. 7C illustrates an exemplary character recognition network according to an embodiment.

FIG. 7C illustrates an exemplary character recognition network 720 comprising tag extractor 212 in accordance with an aspect of the disclosure. The character recognition network 720 is divided into two levels. The first level of network 720 is a decider network 722. The decider network 722 decides if the input image is a character (e.g., single character, alphanumeric, etc.) or an auxiliary word (e.g., multi-character). The second level of decider network 720 includes a single character network 724 and an auxiliary word network 726.

Figure 7D:
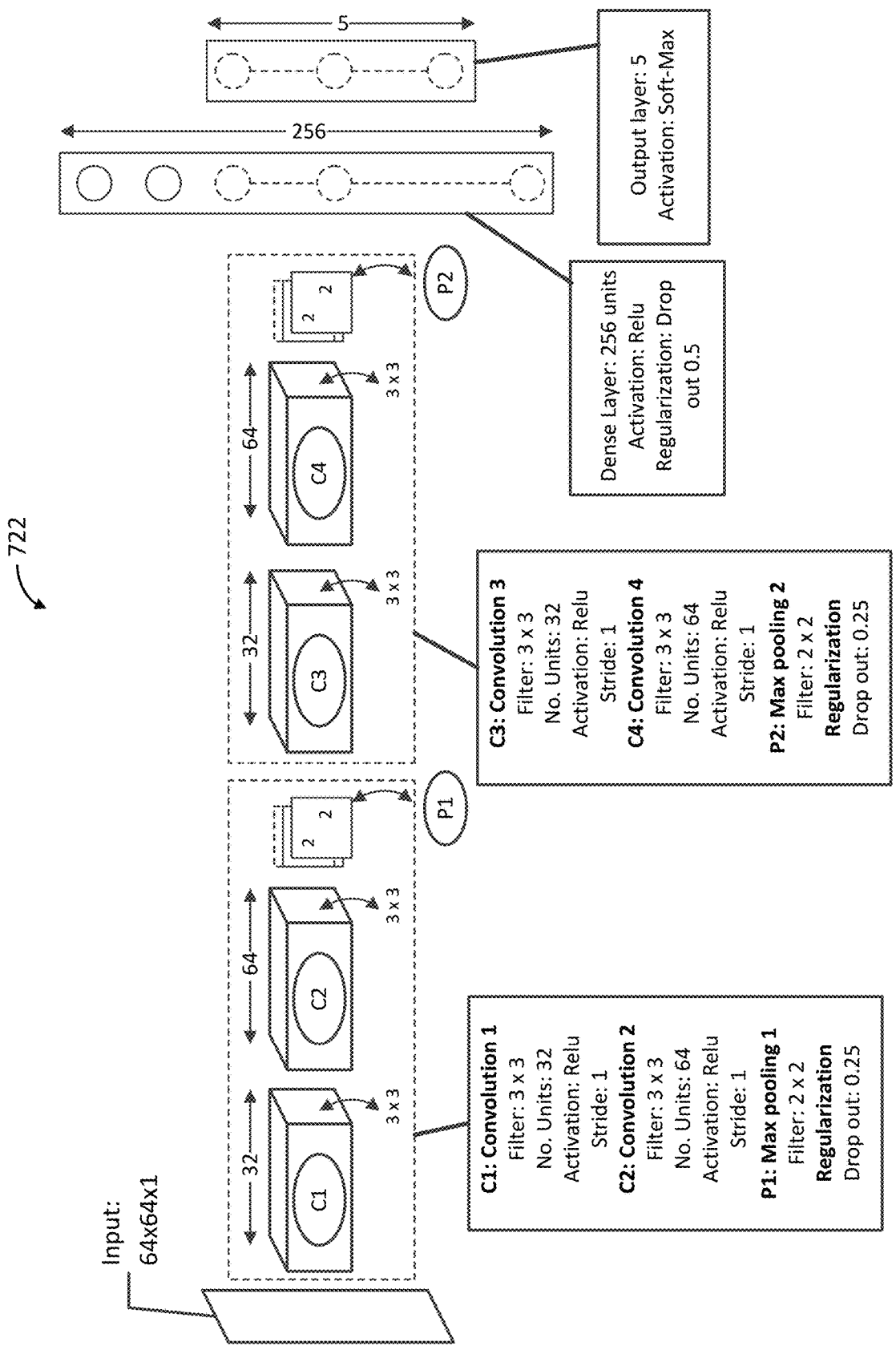
FIG. 7D illustrates a decider convolution network of the character recognition network of FIG. 7C.

FIG. 7D illustrates decider network 722 as a convolution neural network. In an embodiment, decider network 722 inputs one channel of binary images each having a size of 64×64 pixels and outputs the type of the network required for further character classification. In one form, decider network 722 includes a training accuracy of 99.1% on 4431 original training data units and utilizes 75,339 augmented training data units (e.g., 71,575 for training and 3,764 for validation). The table below describes exemplary augmentation techniques utilized for decider network 722 in accordance with an aspect of the disclosure.

| Augmentation Methods | Description | Offset-Value |
| --- | --- | --- |
| Zero-offset | Project input original image to 64 × 64 size image | 0 |
| Horizontal and vertical offsets | Offset horizontal and vertically zero-offset image with specified values | Horizontal: 2, −2, 4, −4<br>Vertical: 2, −2, 4, −4 |
| Diagonal offset | Move zero offset diagonally | Diagonal values:<br>(2, 2), (2, −2), (−2, 2), (−2, −2)<br>(4, 4), (−4, 4), (4, −4), (−4, −4) |

Figure 7E:
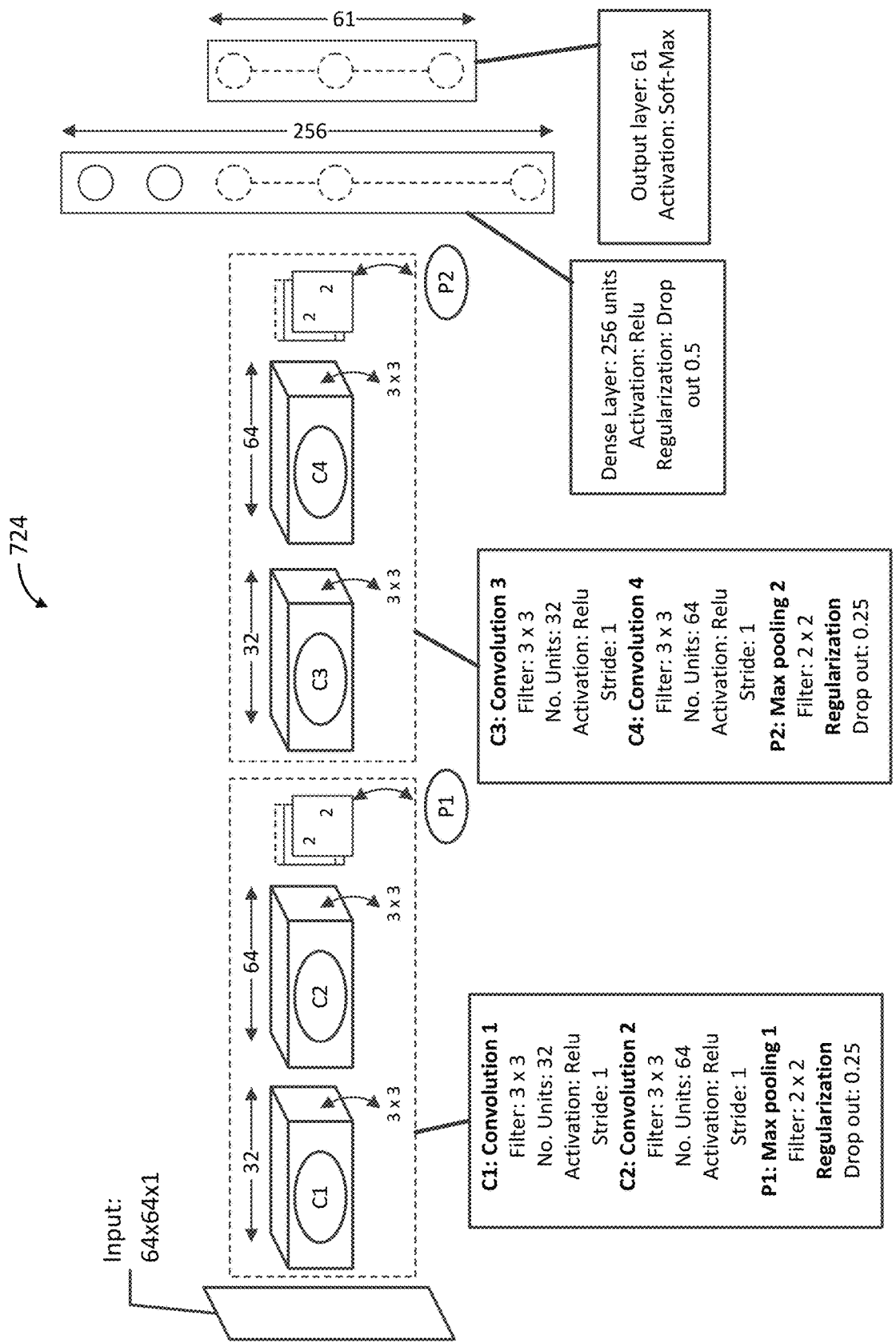
FIG. 7E illustrates a single character convolution network of the character recognition network of FIG. 7C.

FIG. 7E illustrates single character network 724 as a convolution network. In an embodiment, single character network 724 inputs one channel of binary images each having a size of 64×64 pixels and outputs the recognized character. In one form, single character network 724 includes a training accuracy of 98.5% on 4431 original training data units and utilizes 72,882 augmented training data units (e.g., 69,271 for training and 3,611 for validation). The table below describes exemplary augmentation techniques utilized for single character network 724 in accordance with an aspect of the disclosure.

| Augmentation Methods | Description | Offset-Value |
| --- | --- | --- |
| Zero-offset | Project input original image to 64 × 64 size image | 0 |
| Horizontal and vertical offsets | Offset horizontal and vertically zero-offset image with specified values | Horizontal: 2, −2, 4, −4<br>Vertical: 2, −2, 4, −4 |
| Diagonal offset | Move zero offset diagonally | Diagonal values:<br>(2, 2), (2, −2), (−2, 2), (−2, −2)<br>(4, 4), (−4, 4), (4, −4), (−4, −4) |

Figure 7F:
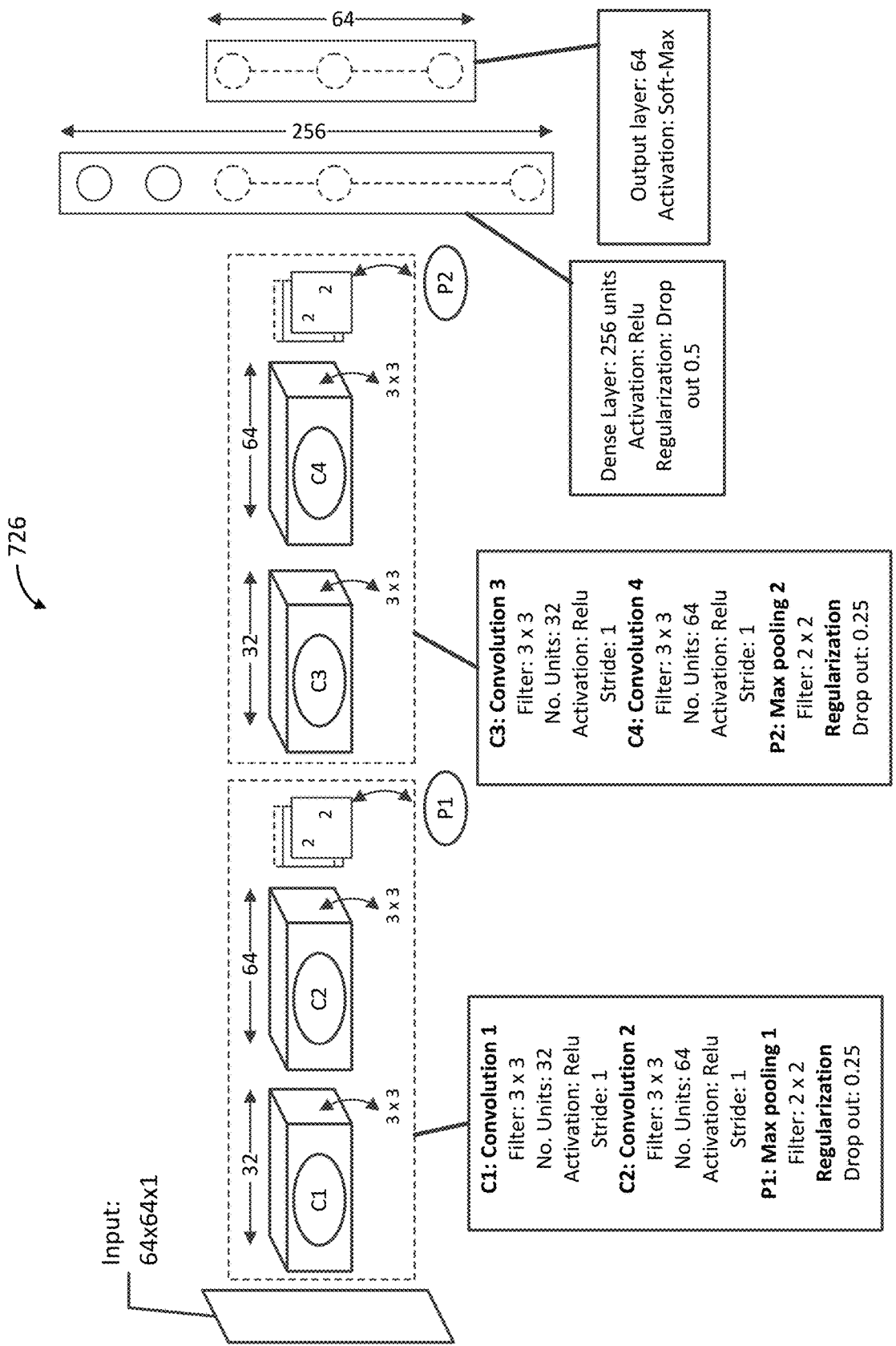
FIG. 7F illustrates an auxiliary word convolution network of the character recognition network of FIG. 7C.

FIG. 7F illustrates auxiliary word network 726 as a convolution network. In an embodiment, auxiliary word network 726 inputs one channel of binary images each having a size of 64×64 pixels and outputs the name of detected symbols. In one form, auxiliary word network 726 includes a training accuracy of 98.2% on 1228 original training data units and utilizes 20,812 augmented training data units (e.g., 19,805 for training and 1,007 for validation). The table below describes exemplary augmentation techniques utilized for auxiliary word network 726 in accordance with an aspect of the disclosure.

| Augmentation Methods | Description | Offset-Value |
| --- | --- | --- |
| Zero-offset | Project input original image to 64 × 64 size image | 0 |
| Horizontal and vertical offsets | Offset horizontal and vertically zero-offset image with specified values | Horizontal: 2, −2, 4, −4<br>Vertical: 2, −2, 4, −4 |
| Diagonal offset | Move zero offset diagonally | Diagonal values:<br>(2, 2), (2, −2), (−2, 2), (−2, −2)<br>(4, 4), (−4, 4), (4, −4), (−4, −4) |

Referring again to FIG. 2, rules engine 214 is configured to verify extracted tags from the compute image based on one or more rules. In an embodiment, the rules are based on ISA symbol standards and are divided into two categories: major compliance checks (e.g., red category) and minor compliance checks (e.g., orange category). Exemplary major compliance checks include, but are not limited to, verifying that the symbol is one of the valid types (e.g., field device, control room display, etc.) and verifying that the tag name has one or more identification letters. Exemplary minor compliance checks include, but are not limited to, verifying that identification letters in a tag name do not contain any numerical digits and the tag number in a tag name does not contain any alphabet characters except at the end. In an embodiment, rules engine 214 comprises processor-executable instructions embodied on a storage memory device to provide rules engine 214 via a software environment. For example, rules engine 214 may be provided as processor-executable instructions that comprise a procedure, a function, a routine, a method, and/or a subprogram utilized independently or in conjunction with additional aspects of system 100 by a computing device, as further described herein, according to an exemplary embodiment of the disclosure.

The line extractor 216 is configured to extract lines between symbols in the compute image. In an embodiment, the extracted lines comprise piping and connections symbols, such as, piping, process connections, electrical signals, pneumatic signals, data links, capillary tubing for filled systems, hydraulic signal lines, and guided electromagnetic or sonic signals. As will be understood by one of ordinary skill in the art, lines are extracted from the image using geometrical line fitting algorithms. Once lines are extracted, a portion of the line is subjected to one or more machine learning models to obtain the type of the line as mentioned above. In an embodiment, line extractor 216 comprises processor-executable instructions embodied on a storage memory device to provide line extractor 216 via a software environment. For example, line extractor 216 may be provided as processor-executable instructions that comprise a procedure, a function, a routine, a method, and/or a subprogram utilized independently or in conjunction with additional aspects of system 100 by a computing device, as further described herein, according to an exemplary embodiment of the disclosure.

Figure 8:
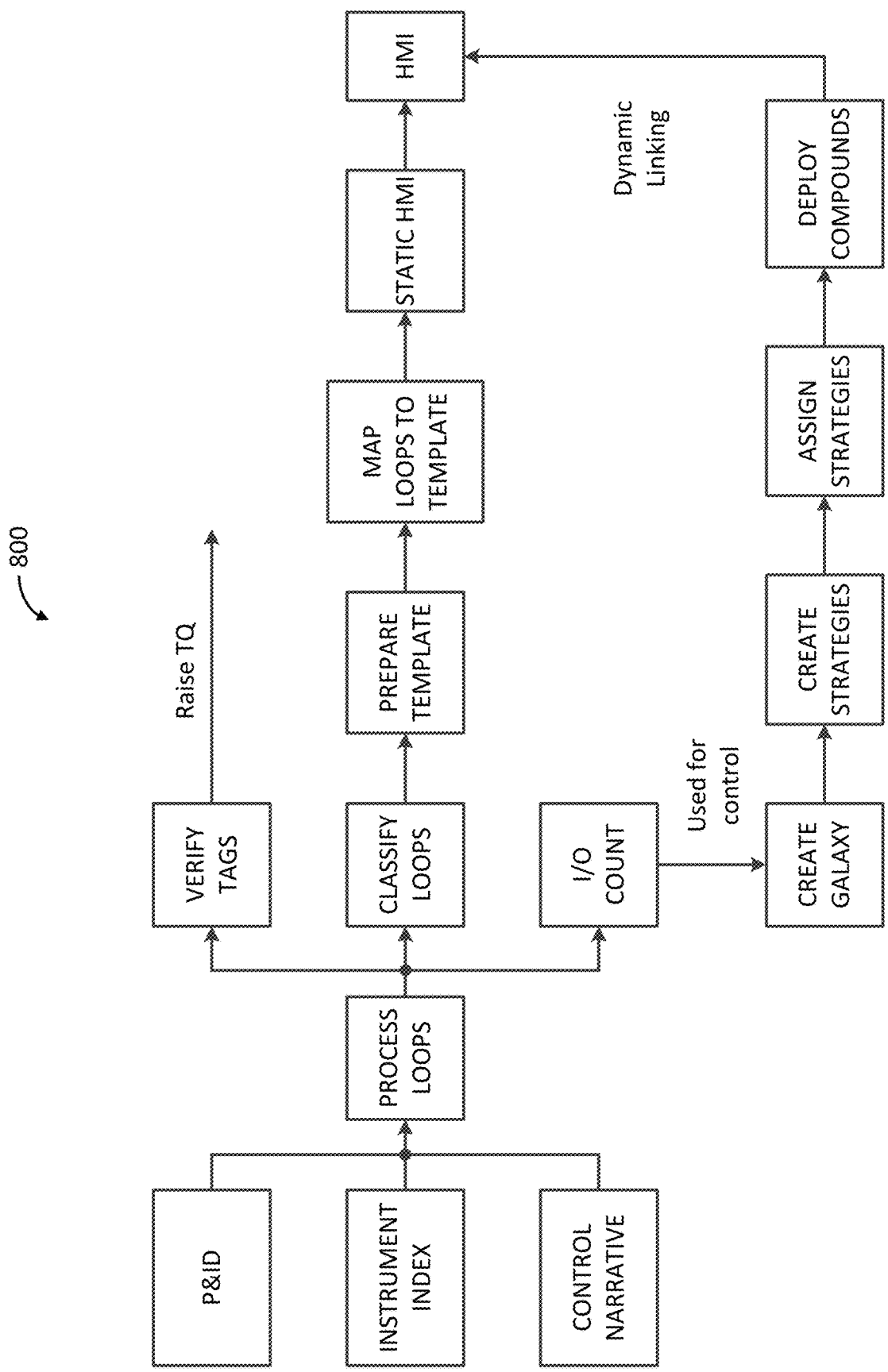
FIGS. 8, 9, and 10 illustrate exemplary workflows of the evolving P&ID analysis system and method of FIG. 1.
Figure 9:
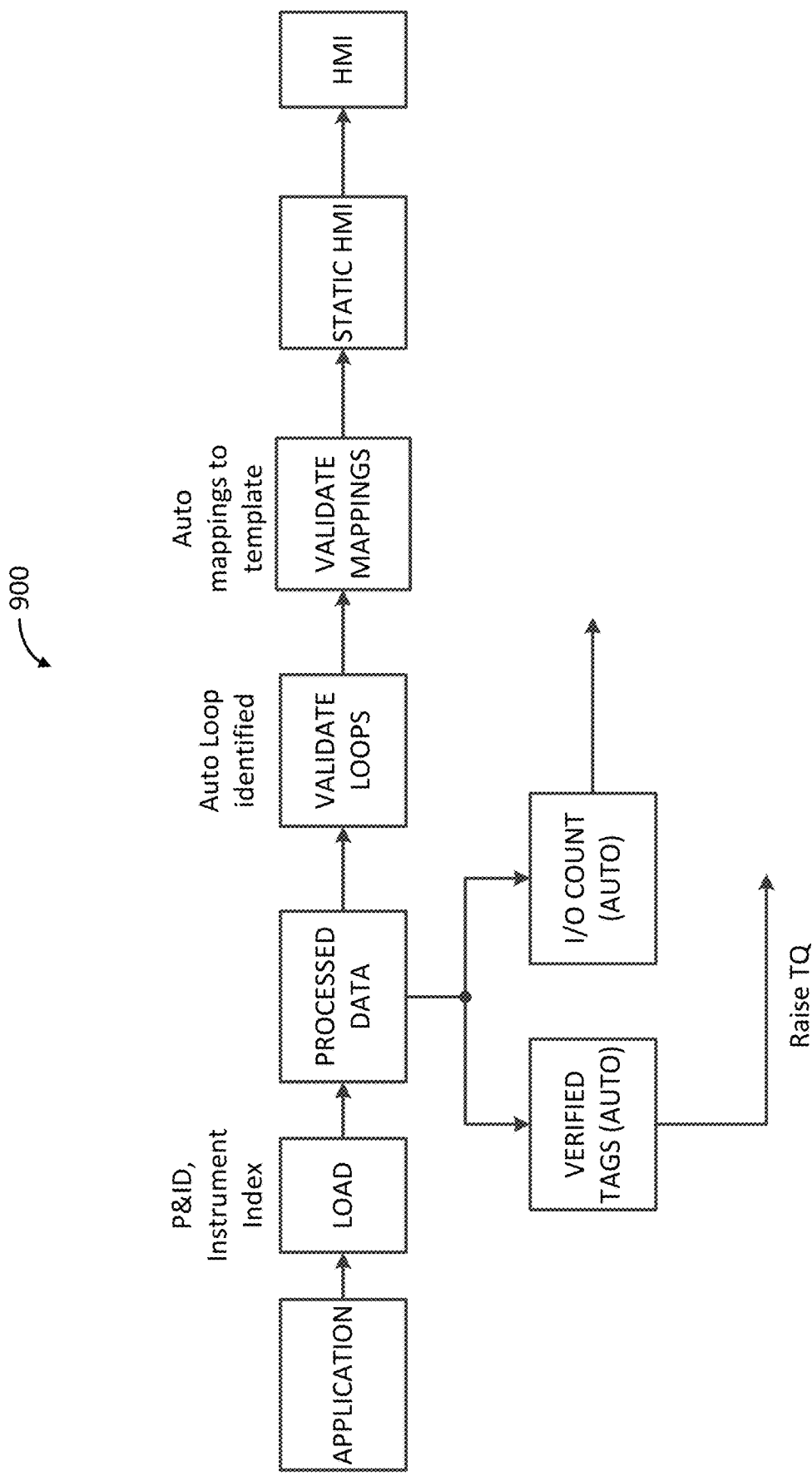

The application 108 is configured display information via GUI 112 (e.g., on a display device of a computing device) to enable a human user to view and/or verify all machine-identified symbols and tags, add, edit, and/or delete symbols and tags, and save (e.g., save data 226) the results to a computer-readable memory device for downstream consumption. Exemplary downstream tasks include, but are not limited to, instrument tag list validation, control and safety software engineering, hardware engineering, automation of HMI and testing tasks, and building asset models with hierarchical information. In an embodiment, application 108 comprises processor-executable instructions embodied on a storage memory device to provide application 108 via a software environment. For example, application 108 may be provided as processor-executable instructions that comprise a procedure, a function, a routine, a method, and/or a subprogram utilized independently or in conjunction with additional aspects of system 100 by a computing device, as further described herein, according to an exemplary embodiment of the disclosure. The application may comprise a desktop application and/or a web browser application in accordance with aspects of the present disclosure. FIG. 8 illustrates an exemplary workflow 800 of system and method 100 utilizing application 108 and FIG. 9 illustrates an exemplary workflow 900 of system and method 100 utilizing application 108 in accordance with aspects of the present disclosure.

Figure 10:
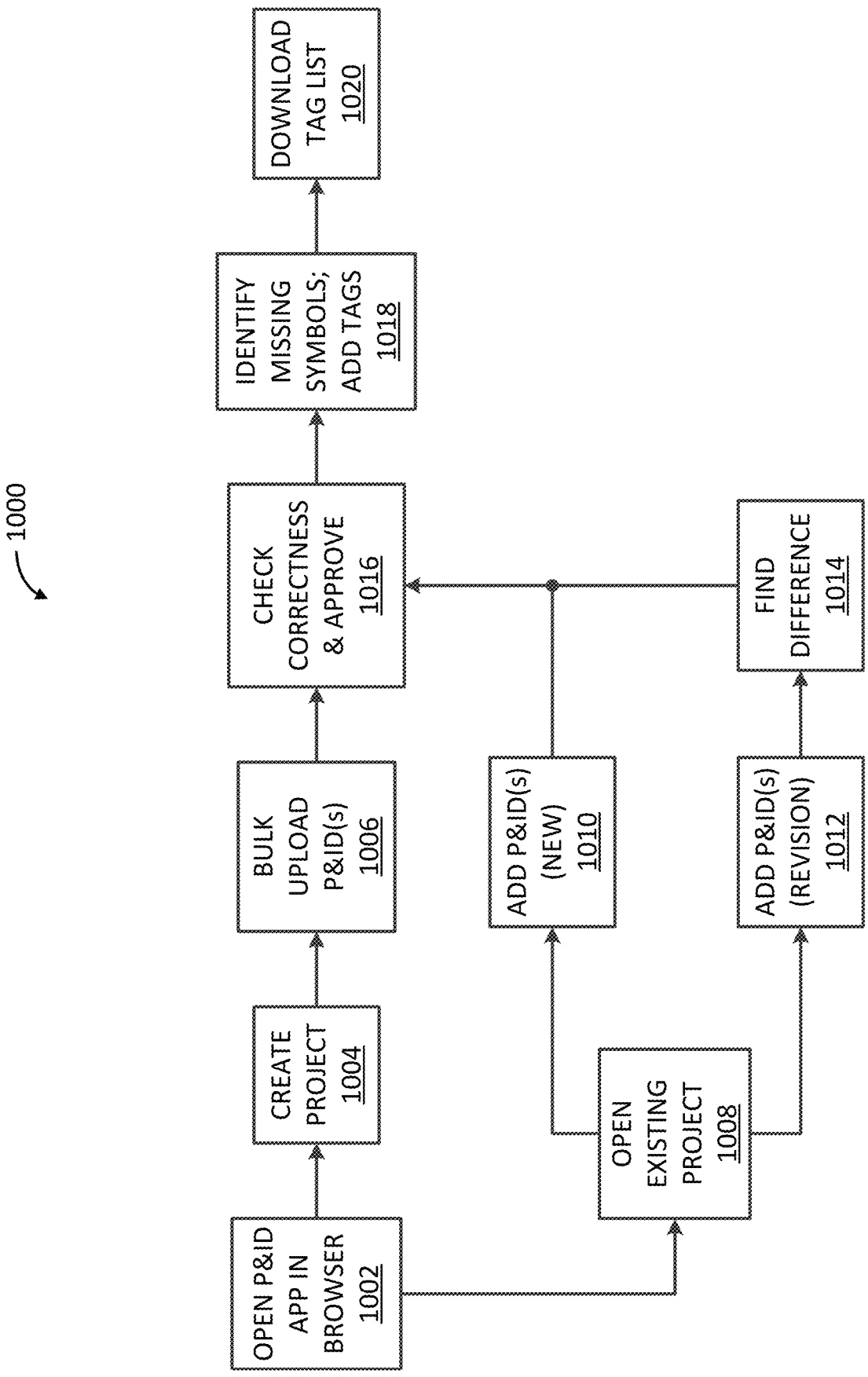

FIG. 10 illustrates an exemplary automated workflow 1000 of system and method 100 utilizing application 108 in accordance with an aspect of the present disclosure. At 1002, application 108 (e.g., P&ID application) is opened in a web browser. When a new project is created in system 100, the workflow proceeds to 1004 in which a new project is created. Continuing to 1006, P&IDs 102 are uploaded in bulk and then the workflow advances to 1016. When utilizing an existing project in system 100, the workflow proceeds to 1008 in which the existing project is opened. In an embodiment, a new P&ID 102 is added to the system at 1010 and then the workflow advances to 1016. In another embodiment, a revised P&ID 102 is added to the system at 1012. At 1014, the difference (e.g., the revision) is found and then the workflow advances to 1016. At 1016, system 100 checks for correctness of tags and symbol types and obtains approval. The system 100 identifies missing symbols and adds tags at 1018. At 1020, system 100 downloads the tag list (e.g., in a comma-separated value (csv) format, etc.).

Referring again to FIG. 2, intelligent system 218 is configured to implement machine learning algorithms to identify symbols in the compute image. In an embodiment, the machine learning algorithm implemented by intelligent system 218 is an exact symbol identification step. In the exact symbol identification step, intelligent system 218 applies a deep neural network to the specific areas of the image obtained through a sliding window on the entire image. This deep neural network results in a multiclass classification of the symbol candidates. In an embodiment, the symbols are classified per ISA symbology. Exemplary symbols include, but are not limited to, instruments, control/display elements, programmable logic controllers (PLCs), valves, pumps, and the like. As described further herein, intelligent system 218 utilizes at least three types of convolutional neural networks to recognize tags and/or tag characters. The three types include a decider network (e.g., decider network 722) to decide if the input is single or multiple characters, a single character network (e.g., single character network 724) to recognize single alphabet and numeral characters, and a multi-character network (e.g., auxiliary word network 726) to recognize multiple characters or words. In an embodiment, intelligent system 218 utilizes context-based prediction to differentiate between similar characters, such as the capital letter "I" from the number "1" and the number "0" from the letter "O" and the like.

Figure 11:
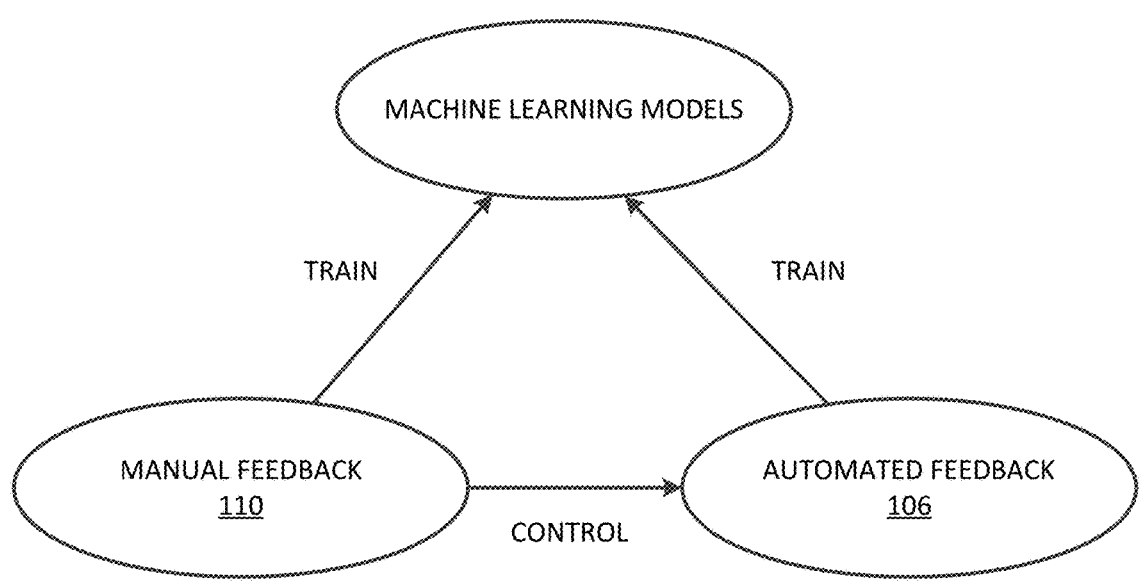
FIG. 11 illustrates a relationship between machine learning models, automated feedback, and manual feedback of the evolving P&ID analysis system and method of FIG. 1.

As illustrated in FIG. 2, intelligent system 218 receives feedback, such as automated feedback 106 and manual feedback 110. The intelligent system 218 utilizes these feedback corrections to train the machine learning algorithms and improve the ability of system 100 to extract relevant information from P&IDs 102. In this manner, intelligent system 218 utilizes supervised learning. FIG. 11 illustrates the relationship between the machine learning models of intelligent system 218, automated feedback 106, and manual feedback 110. The manual feedback 110 is used to directly train the machine learning models and also control aspects of automated feedback 106. The automated feedback 106 also trains the machine learning models. In an embodiment, automated feedback 106 includes validation for symbols and validation for tags and/or characters. Exemplary validation for symbols includes, but is not limited to, verifying that a symbol has well distributed pixels and a high density of black or white pixels indicates the presence of no symbol. Exemplary validation for tags and/or characters includes, but is not limited to, verifying that tags and characters have minimum and maximum sizes in proportion to the size of the symbol, verifying that a given character is comprised of a continuous set of connected pixels (e.g., any gaps indicates a non-character), and verifying that single characters have a width to height ratio between about 0.2 to about 0.8. The intelligent system 218 receives the manual feedback 110 from application 108.

Figure 12:
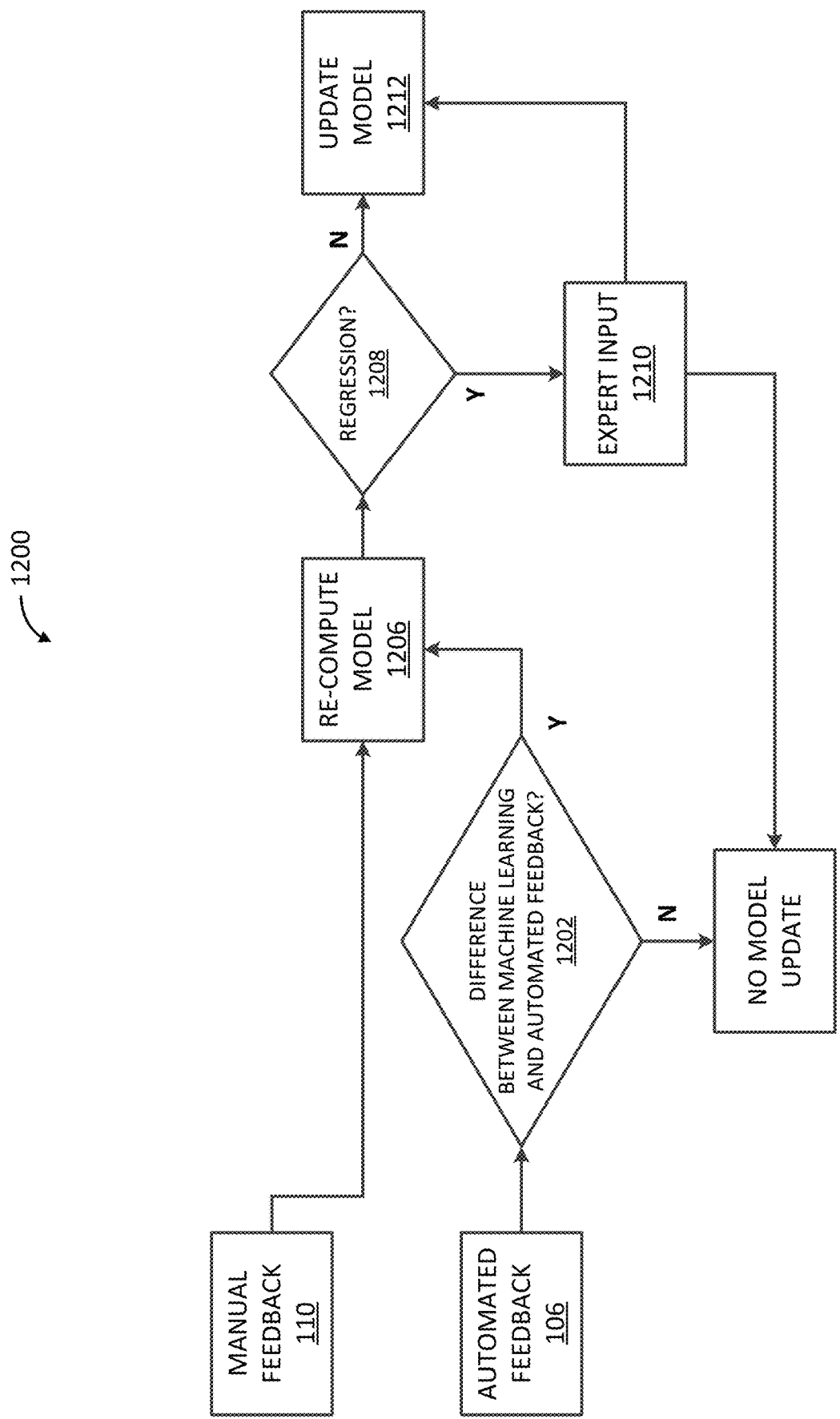
FIG. 12 illustrates an exemplary process of updating an intelligent system based on feedback according to an embodiment.

FIG. 12 illustrates an exemplary method, generally indicated at 1200, of updating intelligent system 218 based on feedback. At 1202, intelligent system 218 receives automated feedback 106 and determines whether there is a difference between the machine learning model and the received automated feedback 106. When no difference exists the model is not updated. But when there is at least one difference between the machine learning model and the received automated feedback 106, the intelligent system 218 re-computes the machine learning model at 1204. When intelligent system 218 receives manual feedback 110, it directly re-computes the machine learning model at 1204. At 1206, intelligent system 218 determines whether there are any regressions in the system. When no regressions are found, the system automatically updates the model at 1212. When regressions are found, an alert is sent to an expert (e.g., via application 108) for taking a decision about whether to update the model or not update the model.

Figure 13:
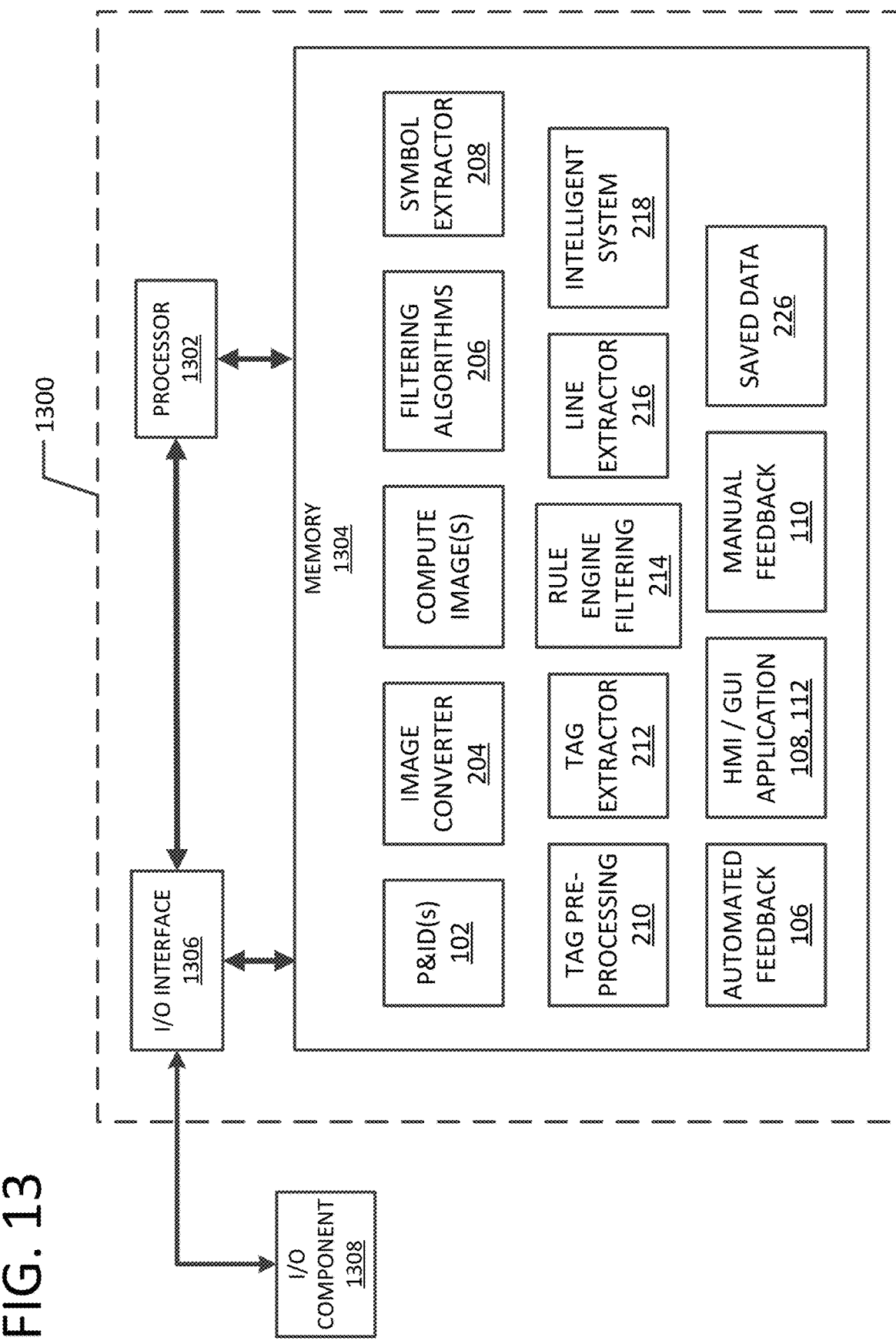
FIG. 13 illustrates an exemplary architecture of a computing device programmed to provide aspects of the evolving P&ID analysis system and method of FIG. 1.

FIG. 13 illustrates an exemplary architecture of a computing device 1300 programmed to provide aspects of the evolving P&ID analysis system and method 100 via a software environment. In this embodiment, computing device 1300 includes a P&ID analysis processor 1302, a memory 1304, and an input/output (I/O) interface 1306 that interfaces with an I/O component 1308. The memory 1304 includes P&IDs 102, image converter 204, the compute image(s), filtering algorithms 206, symbol extractor 208, tag pre-processing algorithms 210, tag extractor 212, rules engine 214, line extractor 216, intelligent system 218, save data 226, automated feedback 106, application 102, GUI 112, and manual feedback 110 each embodied in processor-executable instructions for executing by processor 1302.

The processor 1302, memory 1304, and I/O interface 1306 are communicatively connected and/or electrically connected to each other. The I/O interface 1306 is communicatively and/or electrically connected to the I/O component 1308. The processor 1302 is adapted to execute processor-executable instructions stored in the memory 1302 for implementing the image converter 204, filtering algorithms 206, symbol extractor 208, tag pre-processing algorithms 210, tag extractor 212, rules engine 214, line extractor 216, intelligent system 218, automated feedback 106, application 108, and manual feedback 110. The I/O interface 1306 of FIG. 13 provides a physical data connection between computing device 1300 and I/O component 1308. In an embodiment, I/O interface 1306 is a network interface card (NIC) or modem and I/O component 1308 is a telecommunications network, as further described herein.

Figure 14:
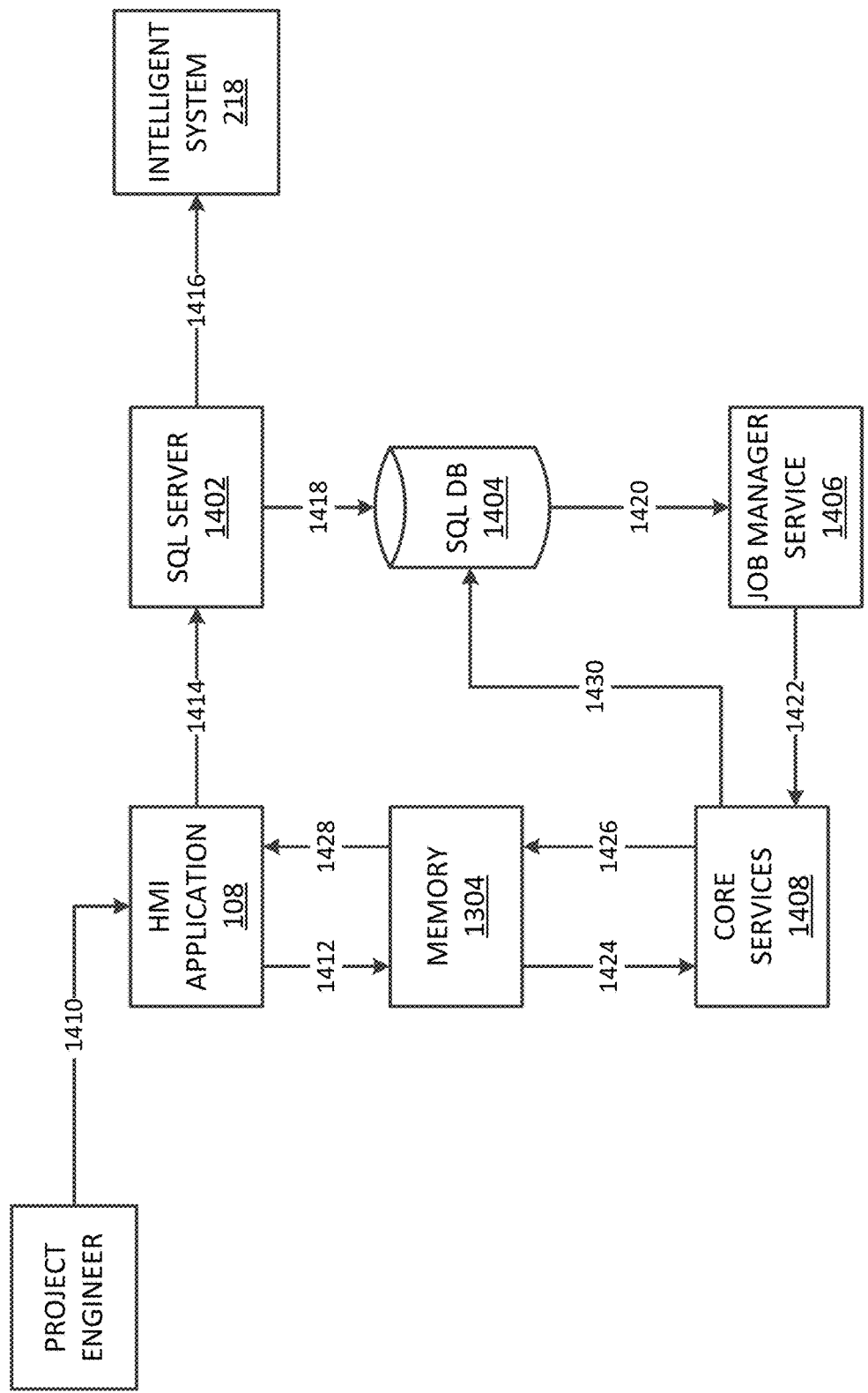
FIG. 14 illustrates an exemplary industrial process system within which aspects of the disclosure may be incorporated.

FIG. 14 illustrates an exemplary an engineering system and method, generally indicated at 1400, within which aspects of the present disclosure may be implemented. In an embodiment, at 1402, a P&ID 102 is provided to application 108. In an embodiment, a project engineer provides the P&ID 102 in a PDF file format. The application 108, at 1412, writes (e.g., save data 226) the received P&ID 102 (e.g., PDF file) to memory device 1304. In an embodiment, memory device 1304 comprises a hard disk resident file system. The application 108 also, at 1414, creates a job on an SQL server 1402 and adds job information to an SQL database 1404 at 1418. A job manager service 1406 reads 1420 the job information from the SQL database 1404 and assigns 1422 the job to core services 1408. The core services 1408 read, at 1424, the P&ID 102 (e.g., PDF file) from the memory device 1304 and perform the evolving P&ID analysis techniques described herein on it. The core services 1408 store a result set (e.g., JSON file, symbol files, symbol data, etc.) of the analysis to the memory device 1304 at 1426 and the result set is provided from the memory device 1304 to the application 108 at 1428. The core services 1408 also update the job information in the SQL database 1404 at 1430. Any changes made (e.g., by the project engineer, etc.) through the HMI application 108 is recorded in the SQL DB 1404 at 1418 and this information is provided to intelligent system 218 (e.g., a "learning system") via the SQL server 1402 at 1416 to update the machine learning models with the new learnings.

In an aspect, the present disclosure provides a computer-implemented method of extracting relevant information from P&IDs and feeding information back into machine learning components for self-evolving and self-learning. The method includes a machine learning system (e.g., machine learning system 104) executing on a computing device (e.g., computing device 1300) that accesses an image of a P&ID (e.g., from image converter 204). A symbol classification engine (e.g., filtering algorithms 206, symbol extractor 208, automated feedback 106, and/or intelligent system 218) executing on the computing device determines whether the accessed image includes a symbol indicative of a process control element (e.g., component of fluid processing system 1410). The symbol classification system is trained, using supervised learning, to classify images into a plurality of classes based on whether the accessed image includes the symbol indicative of the process control element and the relative position of the symbol in the P&ID. Upon determining the accessed image includes the symbol, a symbol output is stored (e.g., saved data 226) in a computer-readable memory storage device (e.g., memory 1304). A tag classification engine (e.g., tag pre-processing algorithms 210, tag extractor 212, automated feedback 106, and/or intelligent system 218) executing on the computing device determines whether the accessed image includes a tag corresponding to the symbol. The tag classification engine is trained, using supervised learning, to classify images into a plurality of classes based on whether the accessed image includes the tag. Upon determining the accessed image includes the tag, a tag output is stored (e.g., saved data 226) in the computer-readable memory storage device.

In another aspect, a system includes a processor (e.g., processor 1302) and a computer-readable storage device (e.g., memory 1304). The storage device stores processor-executable instructions that, when executed by the processor, comprise an image converter (e.g., image converter 204), one or more filtering algorithms (e.g., filtering algorithms 206), a symbol extractor (e.g., symbol extractor 208), one or more tag pre-processing algorithms (e.g., tag pre-processing algorithms 210), a tag extractor (e.g., tag extractor 212), and an intelligent system (e.g., intelligent system 218). The image converter is configured to receive a P&ID in an electronic format and convert it into a compute image in an image format. The filtering algorithms are configured to process the compute image to obtain an approximate size of a symbol in the image. The symbol extractor is configured to extract the symbol from the compute image and store the extracted symbol on the computer-readable storage device. The tag pre-processing algorithms are configured to remove symbol lines from the symbol in the compute image. The tag extractor is configured to extract a tag component of the symbol in the compute image and store the extracted tag on the computer-readable storage device. And the intelligent system is configured to receive symbol feedback from the filtering algorithms, receive tag feedback from the tag pre-processing algorithms, retrain the symbol extractor based on the received symbol feedback, and retrain the tag extractor based on the received tag feedback.

In yet another aspect, the present disclosure provides a computer-implemented method of extracting relevant information from P&IDs and retraining machine learning components. The method includes receiving a digitized P&ID and using a symbol engine (e.g., filtering algorithms 206, symbol extractor 208, automated feedback 106, and/or intelligent system 218) to analyze the digitized P&ID to identify and extract a symbol from it. In one form, the analyzing results in at least one symbol error. A tag engine (e.g., tag pre-processing algorithms 210, tag extractor 212, automated feedback 106, and/or intelligent system 218) is used to analyze the digitized P&ID to identify and extract a tag from it. In one form, the analyzing results in at least one tag error. The extracted symbol and tag are stored on a computer-readable storage medium (e.g., memory 1304). The symbol engine is retrained based on the at least one symbol error and the tag engine is retrained based on the at least one tag error.

Embodiments of the present disclosure may comprise a special purpose computer including a variety of computer hardware, as described in greater detail below.

Embodiments within the scope of the present disclosure also include computer-readable media for carrying or having computer-executable instructions or data structures stored thereon. Such computer-readable media can be any available media that can be accessed by a special purpose computer and comprises computer storage media and communication media. By way of example, and not limitation, computer storage media include both volatile and nonvolatile, removable and non-removable media implemented in any method or technology for storage of information such as computer-readable instructions, data structures, program modules or other data. Computer storage media are non-transitory and include, but are not limited to, random access memory (RAM), read only memory (ROM), electrically erasable programmable ROM (EEPROM), compact disk ROM (CD-ROM), digital versatile disks (DVD), or other optical disk storage, solid state drives (SSDs), magnetic cassettes, magnetic tape, magnetic disk storage, or other magnetic storage devices, or any other medium that can be used to carry or store desired non-transitory information in the form of computer-executable instructions or data structures and that can be accessed by a computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media. Computer-executable instructions comprise, for example, instructions and data which cause a general purpose computer, special purpose computer, or special purpose processing device to perform a certain function or group of functions.

The following discussion is intended to provide a brief, general description of a suitable computing environment in which aspects of the disclosure may be implemented. Although not required, aspects of the disclosure will be described in the general context of computer-executable instructions, such as program modules, being executed by computers in network environments. Generally, program modules include routines, programs, objects, components, data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represent examples of corresponding acts for implementing the functions described in such steps.

Those skilled in the art will appreciate that aspects of the disclosure may be practiced in network computing environments with many types of computer system configurations, including personal computers, hand-held devices, multi-processor systems, microprocessor-based or programmable consumer electronics, network PCs, minicomputers, mainframe computers, and the like. Aspects of the disclosure may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

An exemplary system for implementing aspects of the disclosure includes a special purpose computing device in the form of a conventional computer, including a processing unit, a system memory, and a system bus that couples various system components including the system memory to the processing unit. The system bus may be any of several types of bus structures including a memory bus or memory controller, a peripheral bus, and a local bus using any of a variety of bus architectures. The system memory includes computer storage media, including nonvolatile and volatile memory types. A basic input/output system (BIOS), containing the basic routines that help transfer information between elements within the computer, such as during start-up, may be stored in ROM. Further, the computer may include any device (e.g., computer, laptop, tablet, PDA, cell phone, mobile phone, a smart television, and the like) that is capable of receiving or transmitting an IP address wirelessly to or from the internet.

The computer may also include a magnetic hard disk drive for reading from and writing to a magnetic hard disk, a magnetic disk drive for reading from or writing to a removable magnetic disk, and an optical disk drive for reading from or writing to removable optical disk such as a CD-ROM or other optical media. The magnetic hard disk drive, magnetic disk drive, and optical disk drive are connected to the system bus by a hard disk drive interface, a magnetic disk drive-interface, and an optical drive interface, respectively. The drives and their associated computer-readable media provide nonvolatile storage of computer-executable instructions, data structures, program modules, and other data for the computer. Although the exemplary environment described herein employs a magnetic hard disk, a removable magnetic disk, and a removable optical disk, other types of computer readable media for storing data can be used, including magnetic cassettes, flash memory cards, digital video disks, Bernoulli cartridges, RAMs, ROMs, SSDs, and the like.

Communication media typically embody computer readable instructions, data structures, program modules or other data in a modulated data signal such as a carrier wave or other transport mechanism and includes any information delivery media.

Program code means comprising one or more program modules may be stored on the hard disk, magnetic disk, optical disk, ROM, and/or RAM, including an operating system, one or more application programs, other program modules, and program data. A user may enter commands and information into the computer through a keyboard, pointing device, or other input device, such as a microphone, joy stick, game pad, satellite dish, scanner, or the like. These and other input devices are often connected to the processing unit through a serial port interface coupled to the system bus. Alternatively, the input devices may be connected by other interfaces, such as a parallel port, a game port, or a universal serial bus (USB). A monitor or another display device is also connected to the system bus via an interface, such as a video adapter. In addition to the monitor, personal computers typically include other peripheral output devices (not shown), such as speakers and printers.

One or more aspects of the disclosure may be embodied in computer-executable instructions (i.e., software), routines, or functions stored in system memory or nonvolatile memory as application programs, program modules, and/or program data. The software may alternatively be stored remotely, such as on a remote computer with remote application programs. Generally, program modules include routines, programs, objects, components, data structures, etc. that perform particular tasks or implement particular abstract data types when executed by a processor in a computer or other device. The computer executable instructions may be stored on one or more tangible, non-transitory computer readable media (e.g., hard disk, optical disk, removable storage media, solid state memory, RAM, etc.) and executed by one or more processors or other devices. As will be appreciated by one of skill in the art, the functionality of the program modules may be combined or distributed as desired in various embodiments. In addition, the functionality may be embodied in whole or in part in firmware or hardware equivalents such as integrated circuits, application specific integrated circuits, field programmable gate arrays (FPGA), and the like.

The computer may operate in a networked environment using logical connections to one or more remote computers. The remote computers may each be another personal computer, a tablet, a PDA, a server, a router, a network PC, a peer device, or other common network node, and typically include many or all of the elements described above relative to the computer. The logical connections include a local area network (LAN) and a wide area network (WAN) that are presented here by way of example and not limitation. Such networking environments are commonplace in office-wide or enterprise-wide computer networks, intranets and the Internet.

When used in a LAN networking environment, the computer is connected to the local network through a network interface or adapter. When used in a WAN networking environment, the computer may include a modem, a wireless link, or other means for establishing communications over the wide area network, such as the Internet. The modem, which may be internal or external, is connected to the system bus via the serial port interface. In a networked environment, program modules depicted relative to the computer, or portions thereof, may be stored in the remote memory storage device. It will be appreciated that the network connections shown are exemplary and other means of establishing communications over wide area network may be used.

Preferably, computer-executable instructions are stored in a memory, such as the hard disk drive, and executed by the computer. Advantageously, the computer processor has the capability to perform all operations (e.g., execute computer-executable instructions) in real-time.

The order of execution or performance of the operations in embodiments of the disclosure illustrated and described herein is not essential, unless otherwise specified. That is, the operations may be performed in any order, unless otherwise specified, and embodiments of the disclosure may include additional or fewer operations than those disclosed herein. For example, it is contemplated that executing or performing a particular operation before, contemporaneously with, or after another operation is within the scope of aspects of the disclosure.

Embodiments of the disclosure may be implemented with computer-executable instructions. The computer-executable instructions may be organized into one or more computer-executable components or modules. Aspects of the disclosure may be implemented with any number and organization of such components or modules. For example, aspects of the disclosure are not limited to the specific computer-executable instructions or the specific components or modules illustrated in the figures and described herein. Other embodiments of the disclosure may include different computer-executable instructions or components having more or less functionality than illustrated and described herein.

When introducing elements of aspects of the disclosure or the embodiments thereof, the articles "a", "an", "the" and "said" are intended to mean that there are one or more of the elements. The terms "comprising", "including", and "having" are intended to be inclusive and mean that there may be additional elements other than the listed elements. Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A method, comprising:
   accessing, by a machine learning system executing on a computing device, an image of a piping and instrumentation diagram (P&ID);
   determining, using a symbol classification engine of the machine learning system executing on the computing device, whether the accessed image includes a symbol indicative of a process control element, the symbol classification engine being trained, using supervised learning, to classify images into a plurality of classes based on whether the accessed image includes the symbol indicative of the process control element and a relative position of the symbol in the P&ID;
   storing, in a computer-readable memory storage device, a symbol output indicating the symbol indicative of the process control element upon determining the accessed image includes the symbol;
   determining, using a tag classification engine of the machine learning system executing on the computing device, whether the accessed image includes a tag corresponding to the symbol, the tag classification engine being trained, using supervised learning, to classify images into a plurality of classes based on whether the accessed image includes the tag corresponding to the symbol; and
   storing, in the computer-readable memory storage device, a tag output indicating the tag corresponding to the symbol upon determining the accessed image includes the tag.

2. The method of claim 1, wherein said determining whether the accessed image includes the symbol comprises the symbol classification engine executing a window sliding algorithm, a symbol identification technique, and a circle detection algorithm configured to determine a scale of the image of the P&ID.

3. The method of claim 1, wherein said determining whether the accessed image includes the tag includes the tag classification engine removing symbol lines from the symbol, segmenting characters of the tag, and executing a sliding window segmentation algorithm on the tag.

4. The method of claim 1, wherein the symbol classification engine comprises a first convolutional neural network, and wherein the tag classification engine comprises a second convolutional neural network.

5. The method of claim 1, wherein the tag classification engine comprises a character recognition network, and wherein the character recognition network comprises one or more of a decider convolutional neural network, a single character convolutional neural network, and an auxiliary word convolutional neural network.

6. The method of claim 1, wherein the supervised learning used to train the symbol classification engine and the supervised learning used to train the tag classification engine both comprise manual feedback.

7. The method of claim 1, wherein the supervised learning used to train the symbol classification engine and the supervised learning used to train the tag classification engine both comprise automated feedback.

8. A system, comprising:
   a computing device executing a machine learning system; and
   a computer-readable storage device storing processor-executable instructions, wherein the processor-executable instructions, when executed by the computing device, configure the machine learning system to:
   access an image of a piping and instrumentation diagram (P&ID);
   execute a symbol classification engine for determining whether the accessed image includes a symbol indicative of a process control element, the symbol classification engine being trained, using supervised learning, to classify images into a plurality of classes based on whether the accessed image includes the symbol indicative of the process control element and a relative position of the symbol in the P&ID;
   store, in the computer-readable memory storage device, a symbol output indicating the symbol indicative of the process control element upon determining the accessed image includes the symbol;
   execute a tag classification engine for determining whether the accessed image includes a tag corresponding to the symbol, the tag classification engine being trained, using supervised learning, to classify images into a plurality of classes based on whether the accessed image includes the tag corresponding to the symbol; and store, in the computer-readable memory storage device, a tag output indicating the tag corresponding to the symbol upon determining the accessed image includes the tag.

9. The system of claim 8, wherein said determining whether the accessed image includes the symbol comprises the symbol classification engine executing a window sliding algorithm, a symbol identification technique, and a circle detection algorithm configured to determine a scale of the image of the P&ID.

10. The system of claim 8, wherein said determining whether the accessed image includes the tag includes the tag classification engine removing symbol lines from the symbol, segmenting characters of the tag, and executing a sliding window segmentation algorithm on the tag.

11. The system of claim 8, wherein the symbol classification engine comprises a first convolutional neural network, and wherein the tag classification engine comprises a second convolutional neural network.

12. The system of claim 8, wherein the tag classification engine comprises a character recognition network, and wherein the character recognition network comprises one or more of a decider convolutional neural network, a single character convolutional neural network, and an auxiliary word convolutional neural network.

13. The system of claim 8, wherein the supervised learning used to train the symbol classification engine and the supervised learning used to train the tag classification engine both comprise manual feedback.

14. The system of claim 8, wherein the supervised learning used to train the symbol classification engine and the supervised learning used to train the tag classification engine both comprise automated feedback.

* * * * *